(12) United States Patent
Watanabe et al.

(10) Patent No.: US 11,022,938 B2
(45) Date of Patent: Jun. 1, 2021

(54) DATA GENERATING DEVICE, LIGHT CONTROL DEVICE, DATA GENERATING METHOD, AND COMPUTER-READABLE RECORDING MEDIUM

(71) Applicant: HAMAMATSU PHOTONICS K.K., Hamamatsu (JP)

(72) Inventors: Koyo Watanabe, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 166 days.

(21) Appl. No.: 16/270,968

(22) Filed: Feb. 8, 2019

(65) Prior Publication Data

US 2019/0258205 A1 Aug. 22, 2019

(30) Foreign Application Priority Data

Feb. 19, 2018 (JP) .............................. JP2018-026993

(51) Int. Cl.
*G03H 1/16* (2006.01)
*G03H 1/08* (2006.01)
*G05B 15/02* (2006.01)

(52) U.S. Cl.
CPC ............ *G03H 1/16* (2013.01); *G03H 1/0808* (2013.01); *G05B 15/02* (2013.01); *G03H 2001/0816* (2013.01); *G03H 2223/23* (2013.01)

(58) Field of Classification Search
CPC .................. G03H 1/16; G03H 1/0808; G03H 2001/0816; G03H 2223/23; G03H 1/08;
(Continued)

(56) References Cited

U.S. PATENT DOCUMENTS 8,294,694 B2 * 10/2012 Tsuboi ................. G03H 1/0808
345/204
2006/0131494 A1 * 6/2006 Grier ........................ G03H 1/08
250/251
(Continued)

FOREIGN PATENT DOCUMENTS

JP 2016-218141 A 12/2016
JP 2016-218142 A 12/2016
(Continued)

OTHER PUBLICATIONS

Weiner, A. M., et al. "Shaping of femtosecond pulses using phase-only filters designed by simulated annealing." May 1993, JOSA A vol. 10 No. 5, pp. 1112-1120 (Year: 1993).*

*Primary Examiner* — Marin Pichler
(74) *Attorney, Agent, or Firm* — Faegre Drinker Biddle & Reath LLP

(57) ABSTRACT

A data generating device sets an initial candidate solution of an intensity spectrum function, a phase spectrum function, and an initial temperature and a cooling rate, generates a neighborhood solution, transforms a first waveform function of a frequency domain including the neighborhood solution and the phase spectrum function into a second waveform function of a time domain including a time-intensity waveform function and a time-phase waveform function and calculates an evaluation value representing a degree of difference between the time-intensity waveform function and the desired time-intensity waveform, sets the neighborhood solution as an n-th candidate solution for a certain probability, and lowers the temperature on the basis of the cooling rate. A decrease in the temperature acts in a direction in which the probability P is lowered when the evaluation value of the neighborhood solution is worse than the evaluation value of the candidate solution.

5 Claims, 17 Drawing Sheets

(58) Field of Classification Search
CPC ....... G03H 1/0816; G02F 1/0121; G02F 1/13; G02F 1/133; G02F 1/1336; G02B 2203/12; G06F 17/14; G06F 17/141; G06F 17/142; G06F 17/144; G06F 17/145; G06F 17/147; G06F 17/148; G06F 2111/06
USPC ...................................... 359/11, 29; 345/586
See application file for complete search history.

(56) References Cited

U.S. PATENT DOCUMENTS

2018/0294615 A1* 10/2018 Watanabe .............. G05B 15/02
2018/0348549 A1* 12/2018 Watanabe ................ G02F 1/13

FOREIGN PATENT DOCUMENTS

WO  WO-2016185974 A1 * 11/2016 ............... G02F 1/13
WO  WO-2016185979 A1 * 11/2016 ............. G05B 15/02

* cited by examiner

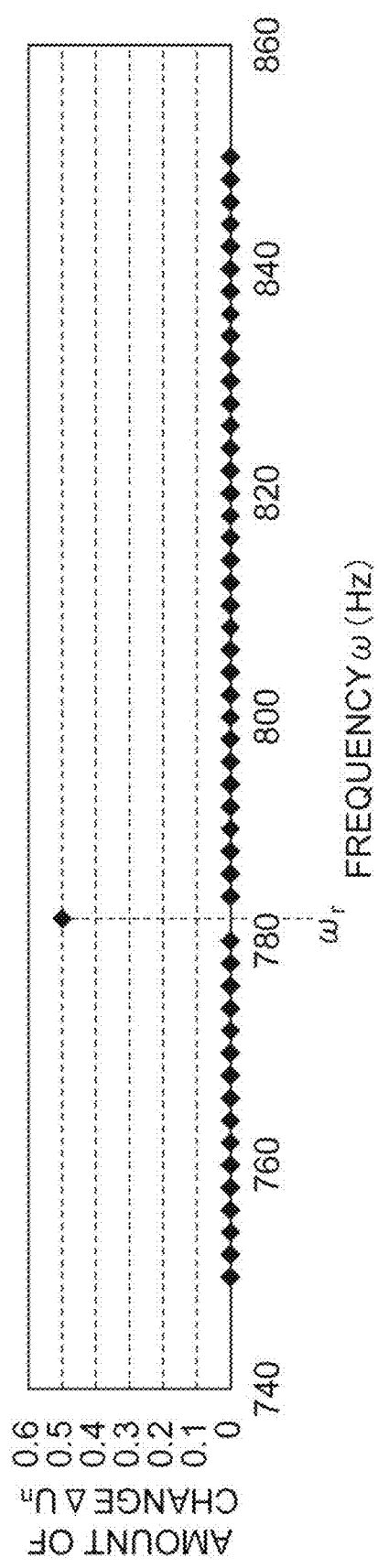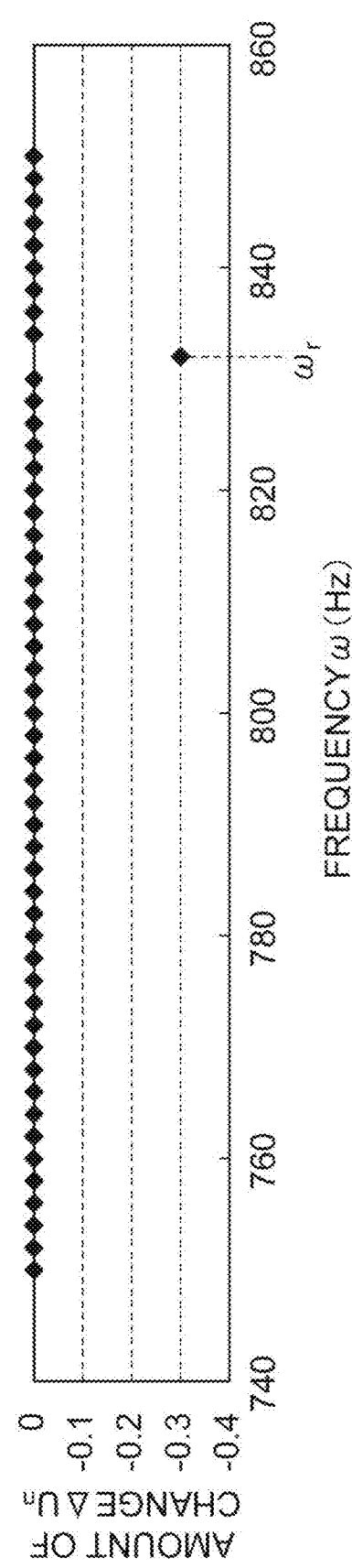

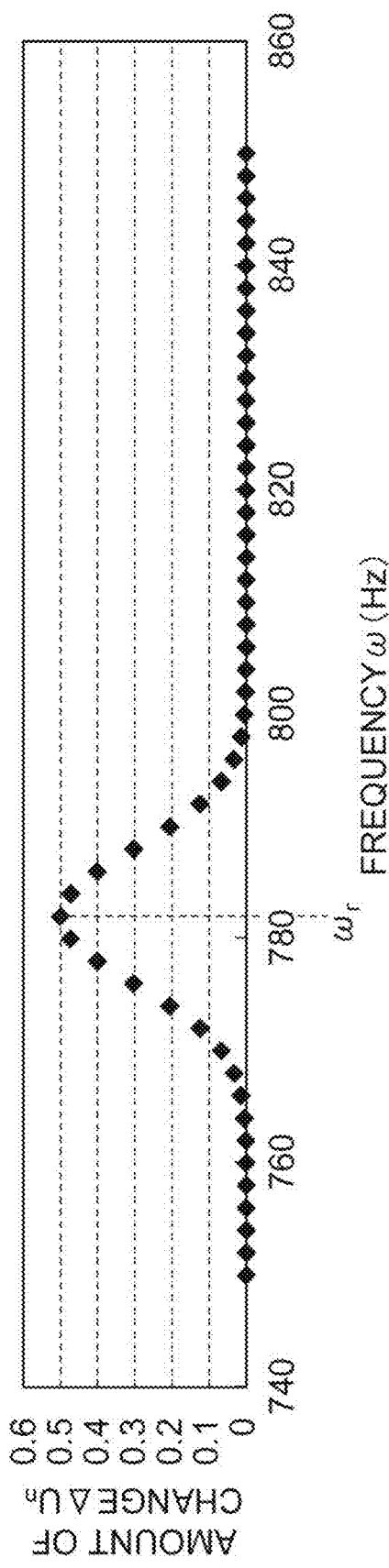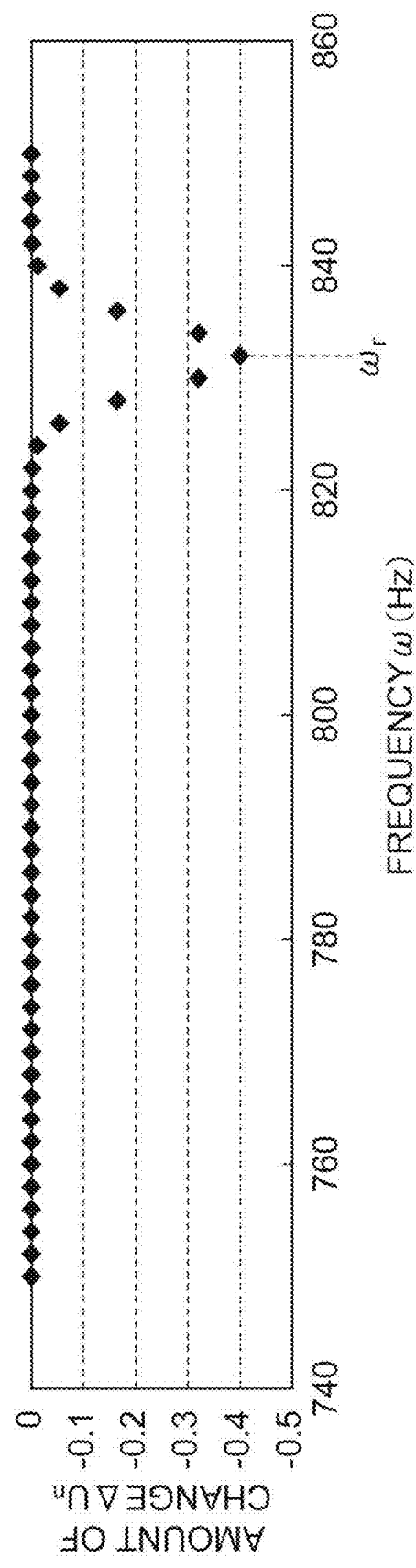

DATA GENERATING DEVICE, LIGHT CONTROL DEVICE, DATA GENERATING METHOD, AND COMPUTER-READABLE RECORDING MEDIUM

TECHNICAL FIELD

One aspect of the present invention relates to a data generating device, a light control device, a data generating method, and a computer-readable recording medium.

BACKGROUND

In Patent Document 1 (Japanese Unexamined Patent Publication No. 2016-218141) and Patent Document 2 (Japanese Unexamined Patent Publication No. 2016-218142), technologies for forming light pulses by modulating at least one of a phase spectrum and an intensity spectrum using a spatial light modulator (SLM) are disclosed. In those documents, at least one of a phase spectrum and an intensity spectrum for acquiring a desired light pulse waveform is calculated using a method with an improved iterative Fourier transform algorithm (IFTA).

For example, as a technology for controlling time waveforms of various kinds of light such as ultra-short pulse light, there is a technology in which a spectrum intensity of a light pulse is modulated using an SLM. In such a technology, the SLM is caused to present a modulation pattern for applying a spectrum intensity, which causes a time waveform of light to approach a desired waveform, to light. In such a case, in order to easily realize an arbitrary time waveform, it is preferable to acquire a spectrum intensity through calculation.

In order to acquire a spectrum intensity through calculation, for example, as illustrated in Patent Documents 1 and 2, an iterative Fourier method or a method with a modified iterative Fourier method is used. However, in the iterative Fourier method and the method with the modified iterative Fourier method, localized solutions occur at a relatively high ratio, and accordingly, a method capable of more accurately calculating an optimal solution is required.

SUMMARY

A data generating device according one aspect of the present invention is a device generating data controlling a spatial light modulator, the data generating device including: an intensity spectrum designing unit configured to generate an intensity spectrum function $A(\omega)$ appropriate for a desired time-intensity waveform; and a data generating unit configured to generate the data on the basis of a phase spectrum function $\Psi(\omega)$ and the intensity spectrum function $A(\omega)$ generated by the intensity spectrum designing unit. The intensity spectrum designing unit includes: an initial value setting unit configured to set an initial candidate solution $A_0(\omega)$ of the intensity spectrum function $A(\omega)$, the phase spectrum function $\Psi(\omega)$, and an initial temperature and a cooling rate in a simulated annealing method; a neighborhood solution generating unit configured to generate a neighborhood solution $A_n(\omega)$ different from an (n−1)-th (here, n is an integer equal to or greater than "1") candidate solution $A_{n-1}(\omega)$ of the intensity spectrum function $A(\omega)$; an evaluation value calculating unit configured to transform a first waveform function of a frequency domain including the neighborhood solution $A_n(\omega)$ and the phase spectrum function $\Psi(\omega)$ into a second waveform function of a time domain including a time-intensity waveform function and a time-phase waveform function and calculate an evaluation value representing a degree of difference between the time-intensity waveform function and the desired time-intensity waveform; a candidate solution substituting unit configured to set the neighborhood solution $A_n(\omega)$ as an n-th candidate solution for a probability $P_n$ (here, $0<P_n \leq 1$) and set the candidate solution $A_{n-1}(\omega)$ as the n-th candidate solution for other cases; and a temperature updating unit configured to lower the temperature on the basis of the cooling rate after the substitution of the candidate solution. The probability $P_n$ is determined in accordance with the evaluation values of the candidate solution $A_{n-1}(\omega)$ and the neighborhood solution $A_n(\omega)$ and the temperature, a decrease in the temperature acts in a direction in which the probability $P_n$ is lowered in a case in which the evaluation value of the neighborhood solution $A_n(\omega)$ is worse than the evaluation value of the candidate solution $A_{n-1}(\omega)$, the neighborhood solution generating unit, the evaluation value calculating unit, the candidate solution substituting unit, and the temperature updating unit repeat the processes with "1" added to n each time until a predetermined condition is satisfied, and the intensity spectrum designing unit sets an n-th candidate solution of a case in which the predetermined condition is satisfied as an intensity spectrum function $A(\omega)$ appropriate for the desired time-intensity waveform.

A data generating method according to one aspect of the present invention is a method of generating data used for controlling a spatial light modulator, the method including: generating an intensity spectrum function $A(\omega)$ appropriate for a desired time-intensity waveform; and generating the data on the basis of a phase spectrum function $\Psi(\omega)$ and the intensity spectrum function $A(\omega)$. Generating of the intensity spectrum function includes: setting an initial candidate solution $A_0(\omega)$ of the intensity spectrum function $A(\omega)$, the phase spectrum function $\Psi(\omega)$, and an initial temperature and a cooling rate in a simulated annealing method; generating a neighborhood solution $A_n(\omega)$ different from an (n−1)-th (here, n is an integer equal to or greater than "1") candidate solution $A_{n-1}(\omega)$ of the intensity spectrum function $A(\omega)$; transforming a first waveform function of a frequency domain including the neighborhood solution $A_n(\omega)$ and the phase spectrum function $\Psi(\omega)$ into a second waveform function of a time domain including a time-intensity waveform function and a time-phase waveform function and calculating an evaluation value representing a degree of difference between the time-intensity waveform function and the desired time-intensity waveform; setting the neighborhood solution $A_n(\omega)$ as an n-th candidate solution for a probability $P_n$ (here, $0<P_n \leq 1$) and setting the candidate solution $A_{n-1}(\omega)$ as the n-th candidate solution for other cases; and lowering the temperature, on the basis of the cooling rate after the substitution of the candidate solution. The probability $P_n$ is determined in accordance with the evaluation values of the candidate solution $A_{n-1}(\omega)$ and the neighborhood solution $A_n(\omega)$ and the temperature, and a decrease in the temperature acts in a direction in which the probability $P_n$ is lowered in a case in which the evaluation value of the neighborhood solution $A_n(\omega)$ is worse than the evaluation value of the candidate solution $A_{n-1}(\omega)$, and generating of the neighborhood solution, calculating of the evaluation value, substituting of the candidate solution, and updating of the temperature are repeated with "1" added to n each time until a predetermined condition is satisfied, and, in generating of the intensity spectrum function, an n-th candidate solution of a case in which the predetermined condition is satisfied is set as an intensity spectrum function $A(\omega)$ appropriate for the desired time-intensity waveform.

A computer-readable storage medium according to one aspect of the present invention is a non-transitory computer-readable storage medium including computer-readable instructions that, when executed by a computer, cause the computer to execute the data generating method described above.

BRIEF DESCRIPTION OF THE DRAWINGS

FIG. 8 is a diagram schematically illustrating a technique of calculating a candidate solution $A_0(\omega)$ using an initial candidate solution generating unit 25a;

FIG. 9A is a graph illustrating one example of a function $U(\omega)$;

FIG. 9B is a graph illustrating one example of the function $U(\omega)$;

FIG. 10A is a graph illustrating one example of a function $U(\omega)$ represented in Equation (12);

FIG. 10B is a graph illustrating one example of the function $U(\omega)$ represented in Equation (12);

DETAILED DESCRIPTION

Figure 1:
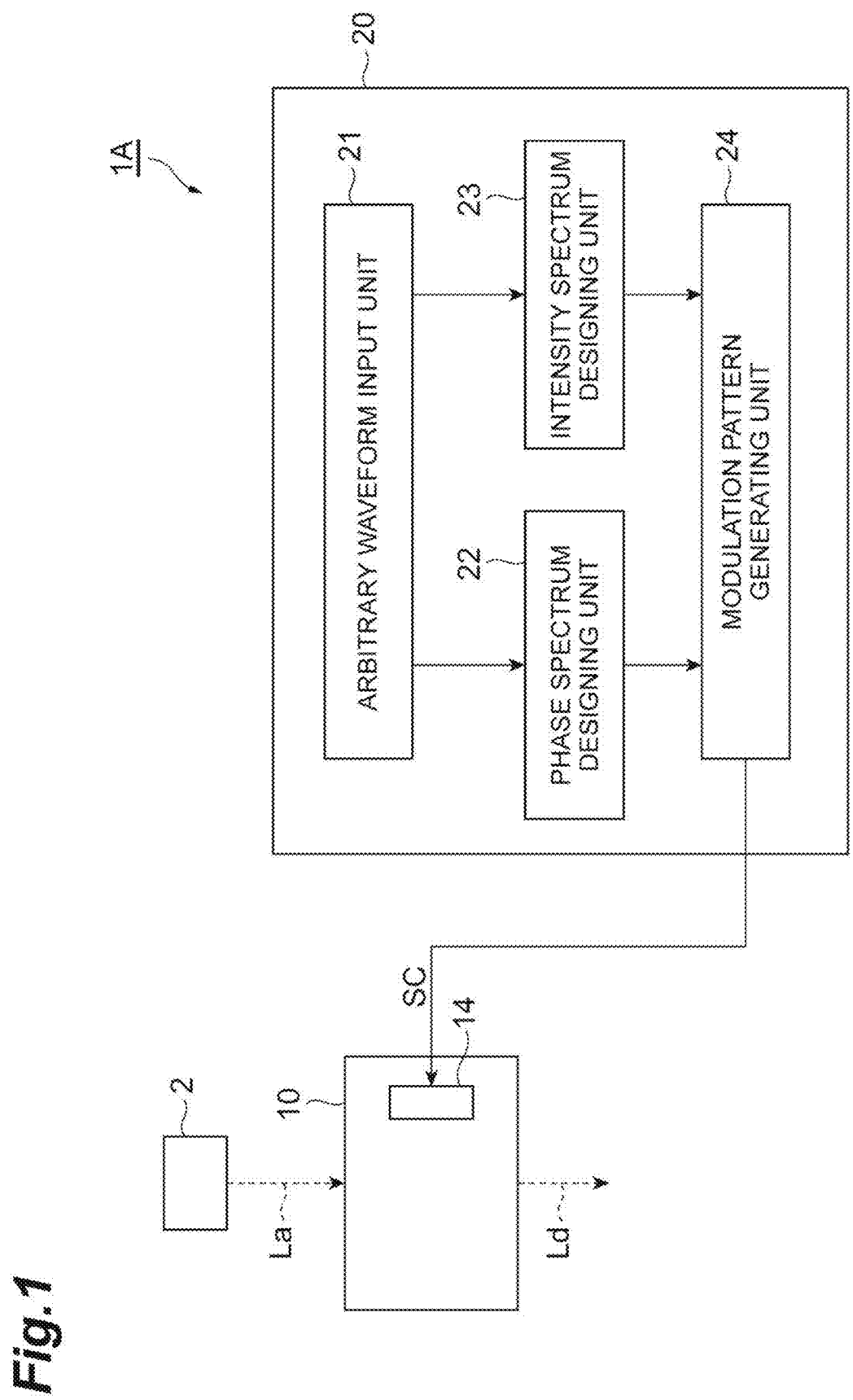
FIG. 1 is a diagram schematically illustrating the configuration of a light control device 1A according to a first embodiment of the present invention.

Hereinafter, a data generating device, a light control device, a data generating method, and a computer-readable recording medium according to embodiments of the present invention will be described in detail with reference to the attached drawings. In description of the drawings, the same reference numeral will be assigned to the same element, and duplicate description thereof will not be presented.

(First Embodiment)

Figure 2:
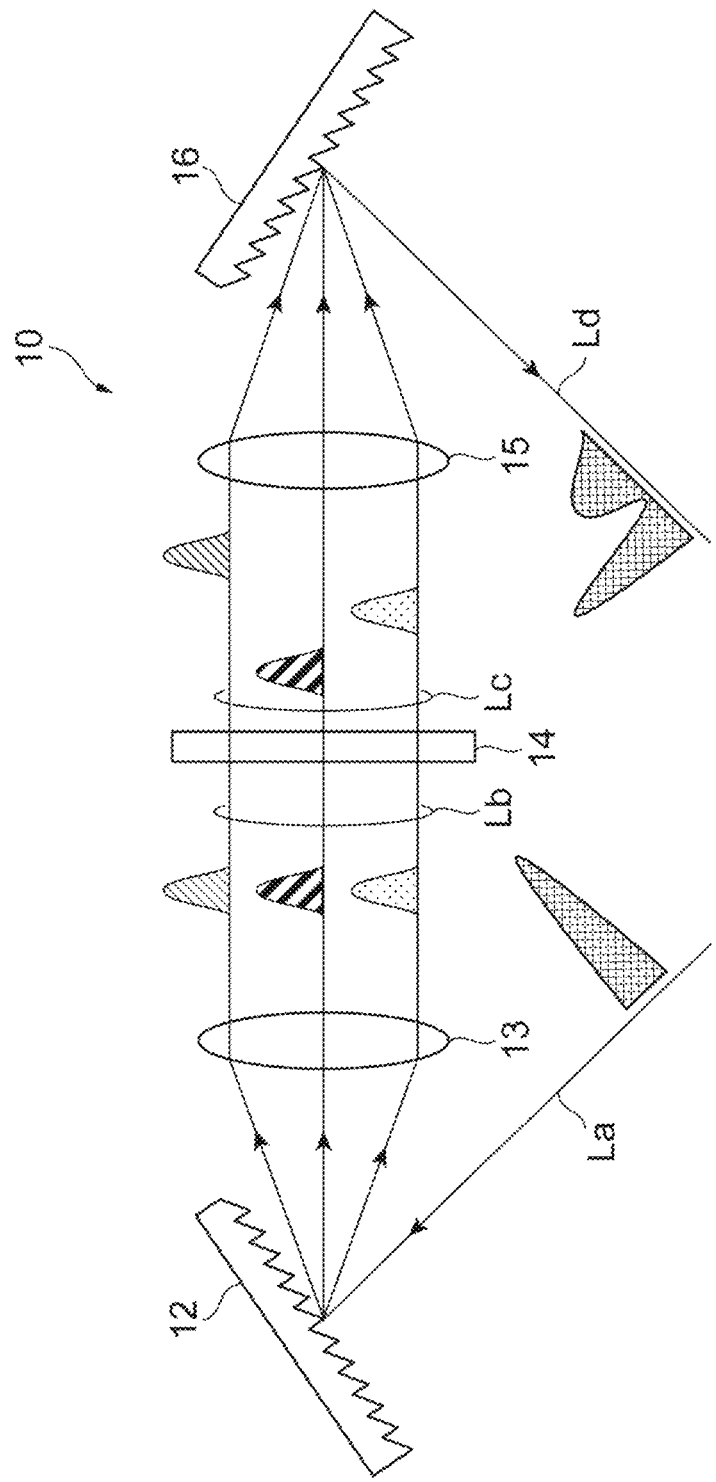
FIG. 2 is a diagram illustrating the configuration of an optical system 10 included in the light control device 1A.

FIG. 1 is a diagram schematically illustrating the configuration of a light control device 1A according to a first embodiment of the present invention. FIG. 2 is a diagram illustrating the configuration of an optical system 10 included in the light control device 1A. The light control device 1A according to this embodiment generates output light Ld having an arbitrary time-intensity waveform different from that of the input light La from the input light La. As illustrated in FIG. 1, the light control device 1A includes a light source 2, an optical system 10, and a modulation pattern calculating device (a data generating device) 20.

The light source 2 outputs input light La input to the optical system 10. The light source 2, for example, is a laser light source such as a solid-state laser light source or a fiber laser light source, and the input light La, for example, is coherent pulse light. The optical system 10 includes an SLM 14 and receives a control signal SC from the modulation pattern calculating device 20 in the SLM 14. The optical system 10 converts the input light La input from the light source 2 to output light Ld having an arbitrary time-intensity waveform. The modulation pattern is data for controlling the SLM 14 and is data acquired by outputting intensities of a complex amplitude distribution or intensities of a phase distribution to a file. The modulation pattern, for example, is a computer-generated hologram (CGH).

As illustrated in FIG. 2, the optical system 10 includes a diffraction grating 12, a lens 13, an SLM 14, a lens 15, and a diffraction grating 16. The diffraction grating 12 is a spectroscopic element according to this embodiment and is optically coupled with the light source 2. The SLM 14 is optically coupled with the diffraction grating 12 through the lens 13. The diffraction grating 12 spectrally diffracts the input light La for each wavelength component. In addition, instead of the diffraction grating 12 as a spectroscopic element, any other optical component such as a prism may be used. The input light La is obliquely incident on the diffraction grating 12 and is spectrally diffracted into a plurality of wavelength components. Light Lb including the plurality of wavelength components is condensed for each wavelength component by the lens 13 and is formed on a modulation plane of the SLM 14 as an image. The lens 13 may be a convex lens formed from a light transmissive member or may be a concave mirror having a concave light reflecting surface.

Figure 3:
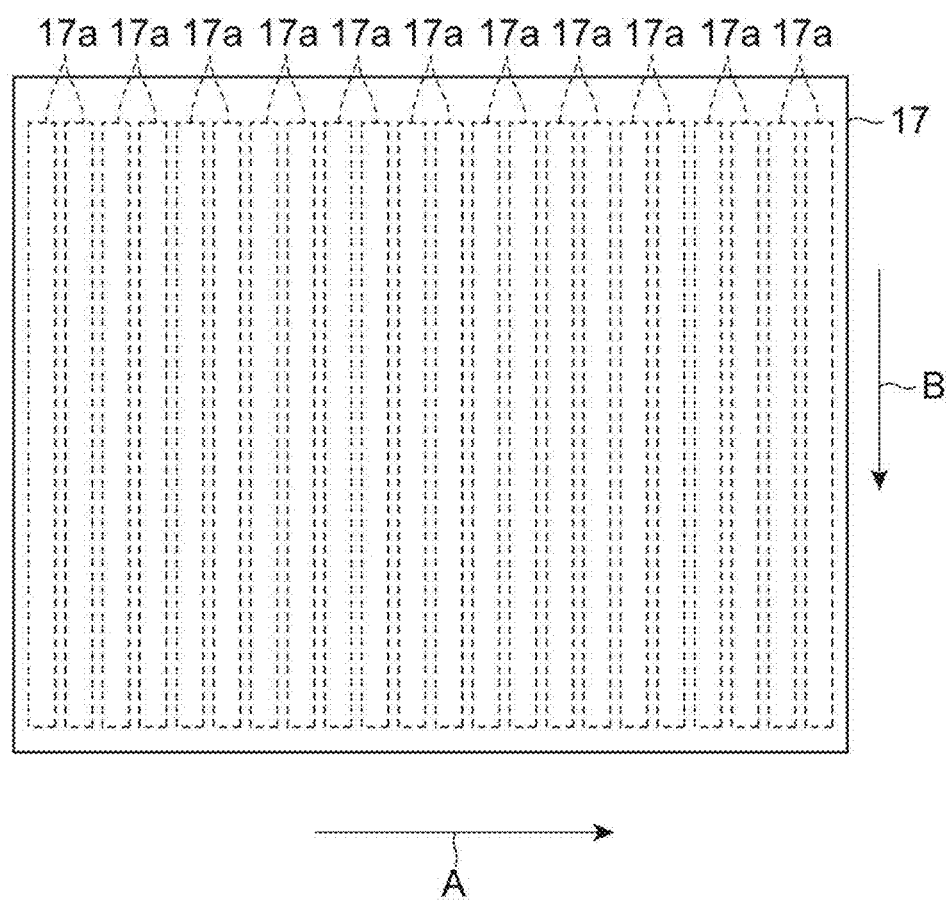
FIG. 3 is a diagram illustrating a modulation plane 17 of an SLM 14.

In order to generate output light Ld having an arbitrary time-intensity waveform different from that of the input light La, the SLM 14 simultaneously performs phase modulation and intensity modulation of the light Lb. The SLM 14 may perform only the intensity modulation. The SLM 14, for example, is a phase modulation type. In one embodiment, the SLM 14 is a liquid crystal on silicon (LCOS) type. FIG. 3 is a diagram illustrating a modulation plane 17 of the SLM 14. As illustrated in FIG. 3, on the modulation plane 17, a plurality of modulation areas 17*a* are aligned in a certain direction A, and each modulation area 17*a* extends in a direction B intersecting with the direction A. The direction A is a spectral diffraction direction according to the diffraction grating 12. This modulation plane 17 works as a Fourier transformation plane, and each corresponding wavelength component after spectral diffraction is incident on one of the plurality of modulation areas 17*a*. The SLM 14 modulates a phase and an intensity of each incident wavelength component in each modulation area 17*a*, independently from other wavelength components. In addition, since the SLM 14 according to this embodiment is the phase modulation type, the intensity modulation is realized by a phase pattern (a phase image) presented on the modulation plane 17.

Wavelength components of the modulated light Lc modulated by the SLM 14 are gathered at one point on the diffraction grating 16 by the lens 15. At this time, the lens 15 functions as a condensing optical system that condenses the modulated light Lc. The lens 15 may be a convex lens formed using an optical transmissive member or may be a concave mirror having a concave light reflecting surface. In addition, the diffraction grating 16 functions as a wavelength multiplexing optical system and multiplexes wavelength components after modulation. In other words, in accordance with the lens 15 and the diffraction grating 16, a plurality of wavelength components of the modulated light Lc are condensed, multiplexed, and become output light Ld.

Figure 4A:
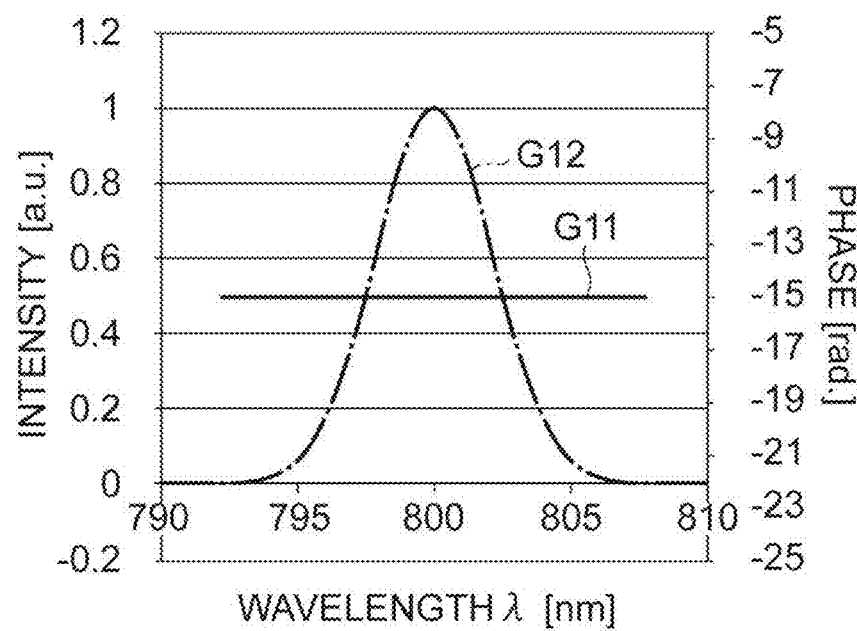
FIG. 4A is a diagram illustrating a spectrum waveform (a spectrum phase G11 and a spectrum intensity G12) of input light La having a single-pulse shape as one example.
Figure 4B:
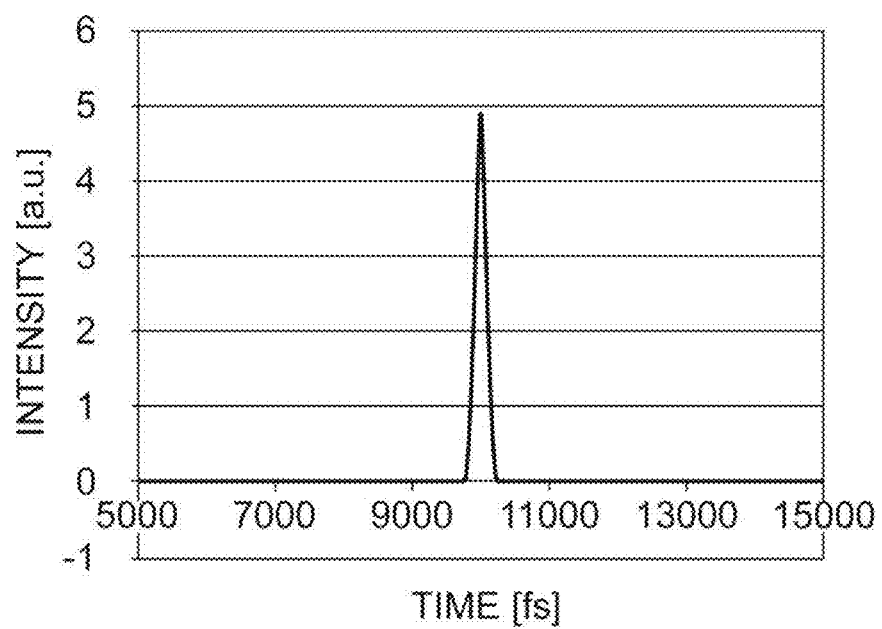
FIG. 4B is a diagram illustrating a time-intensity waveform of the input light La.
Figure 5A:
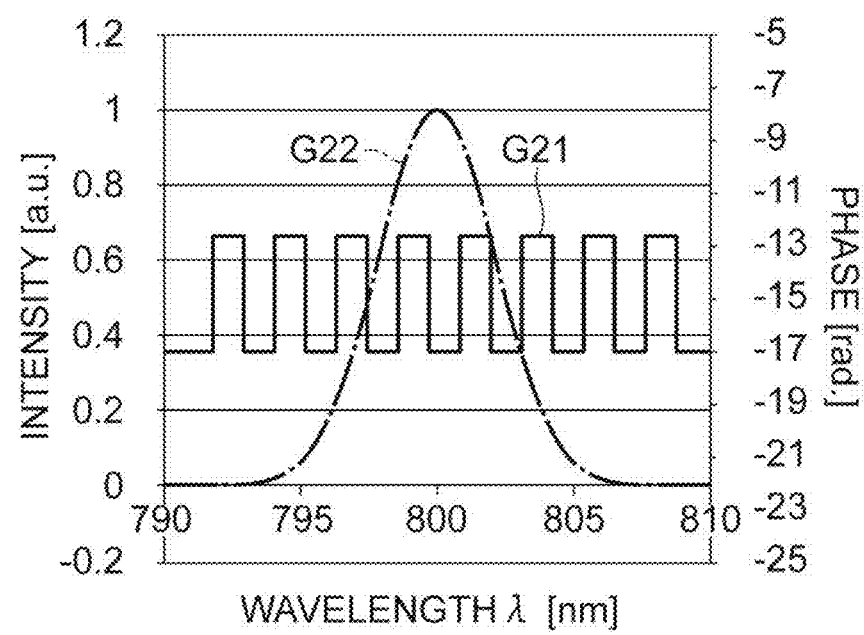
FIG. 5A is a diagram illustrating a spectrum waveform (a spectrum phase G21 and a spectrum intensity G22) of output light Ld when phase spectrum modulation of a rectangular waveform is applied using the SLM 14 as one example.
Figure 5B:
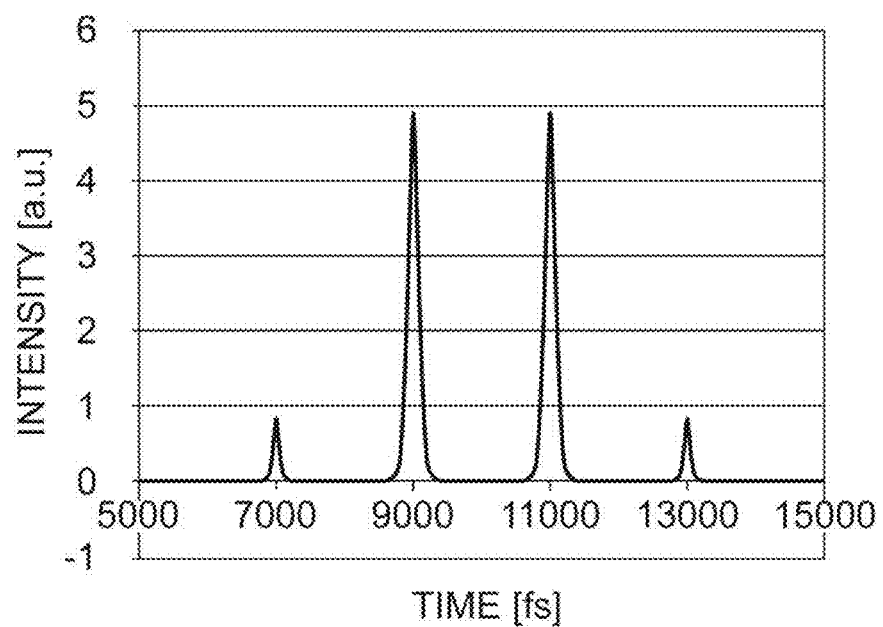
FIG. 5B is a diagram illustrating a time-intensity waveform of the output light Ld.

A domain before the lens 15 (a spectrum domain) and a domain after the diffraction grating 16 (a time domain) are in a relation of a Fourier transform, and phase modulation and intensity modulation in the spectrum domain have influences on a time-intensity waveform in the time domain. Accordingly, the output light Ld has a desired time-intensity waveform different from that of the input light La in accordance with a modulation pattern of the SLM 14. Here, FIG. 4A illustrates a spectrum waveform (a spectrum phase G11 and a spectrum intensity G12) of input light La having a single pulse shape as one example, and FIG. 4B illustrates a time-intensity waveform of the input light La. In addition, FIG. 5A illustrates a spectrum waveform of output light Ld (a spectrum phase G21 and a spectrum intensity G22) when phase spectrum modulation having a rectangular waveform is given by the SLM 14 as one example, and FIG. 5B illustrates a time-intensity waveform of the output light Ld. In FIGS. 4A and 5A, a horizontal axis represents a wavelength (nm), a left vertical axis represents an intensity value (in arbitrary units) of the intensity spectrum, and a right vertical axis represents a phase value (rad) of the phase spectrum. In addition, in FIGS. 4B and 5B, a horizontal axis represents time (femtoseconds), and a vertical axis represents a light intensity (in arbitrary units). In this example, by applying a phase spectrum waveform having a rectangular waveform to the output light Ld, the single pulse of the input light La is converted into double pulses accompanying higher order light as the output light Ld. Here, the spectrums and the waveforms illustrated in FIGS. 4A, 4B, 5A, and 5B are examples, and the time-intensity waveform of the output light Ld can be shaped in various forms in accordance with various phase spectrums and intensity spectrums.

FIG. 1 will be referred to again. The modulation pattern calculating device 20, for example, is a computer including a processor such as a personal computer, a smart device such as a smartphone or a tablet terminal, or a cloud server. The modulation pattern calculating device 20 is electrically connected to the SLM 14, calculates a phase modulation pattern for causing the time-intensity waveform of the output light Ld to approach a desired waveform, and provides a control signal SC including the phase modulation pattern for the SLM 14. The modulation pattern calculating device 20 according to this embodiment causes the SLM 14 to present phase patterns including a phase pattern for phase modulation to apply a phase spectrum for acquiring a desired waveform to the output light Ld and a phase pattern for intensity modulation to apply an intensity spectrum for acquiring the desired waveform to the output light Ld. For this reason, the modulation pattern calculating device 20 includes an arbitrary waveform input unit 21, a phase spectrum designing unit 22, an intensity spectrum designing unit 23, and a modulation pattern generating unit (a data generating unit) 24. In other words, a processor of a computer disposed in the modulation pattern calculating device 20 realizes a function of the arbitrary waveform input unit 21, a function of the phase spectrum designing unit 22, a function of the intensity spectrum designing unit 23, and a function of the modulation pattern generating unit 24. Each function may be realized by the same processor or may be realized by a different processor.

The processor of the computer can realize each function described above in accordance with a modulation pattern calculating program (a data generating program). Accordingly, the modulation pattern calculating program includes computer-readable instructions causing the processor of the computer to operate as the arbitrary waveform input unit 21, the phase spectrum designing unit 22, the intensity spectrum designing unit 23, and the modulation pattern generating unit 24 of the modulation pattern calculating device 20 when the program is executed by the computer. The modulation pattern calculating program is stored in a computer-readable storage device (a storage medium) inside or outside the computer. The storage device may be a non-transitory recording medium. Examples of the recording medium include a recording medium such as a flexible disk, a CD, or a DVD, a recording medium such as a ROM, a semiconductor memory, a cloud server, and the like.

The arbitrary waveform input unit 21 accepts an input of a desired time-intensity waveform from an operator. The operator inputs information relating to a desired time-intensity waveform (for example, a pulse width, the number of pulses, and the like) to the arbitrary waveform input unit 21. The information relating to a desired time-intensity waveform is given to the phase spectrum designing unit 22 and the intensity spectrum designing unit 23. The phase spectrum designing unit 22 calculates a phase spectrum of the output light Ld that is appropriate for the realization of the given desired time-intensity waveform. The intensity spectrum designing unit 23 calculates an intensity spectrum of the output light Ld that is appropriate for the realization of the given desired time-intensity waveform. The modulation pattern generating unit 24 calculates a phase modulation pattern (for example, a computer-generated hologram) for applying the phase spectrum acquired by the phase spectrum designing unit 22 and the intensity spectrum acquired by the intensity spectrum designing unit 23 to the output light Ld. Then, a control signal SC including the calculated phase modulation pattern is provided for the SLM 14, and the SLM 14 is controlled on the basis of the control signal SC.

Figure 6:
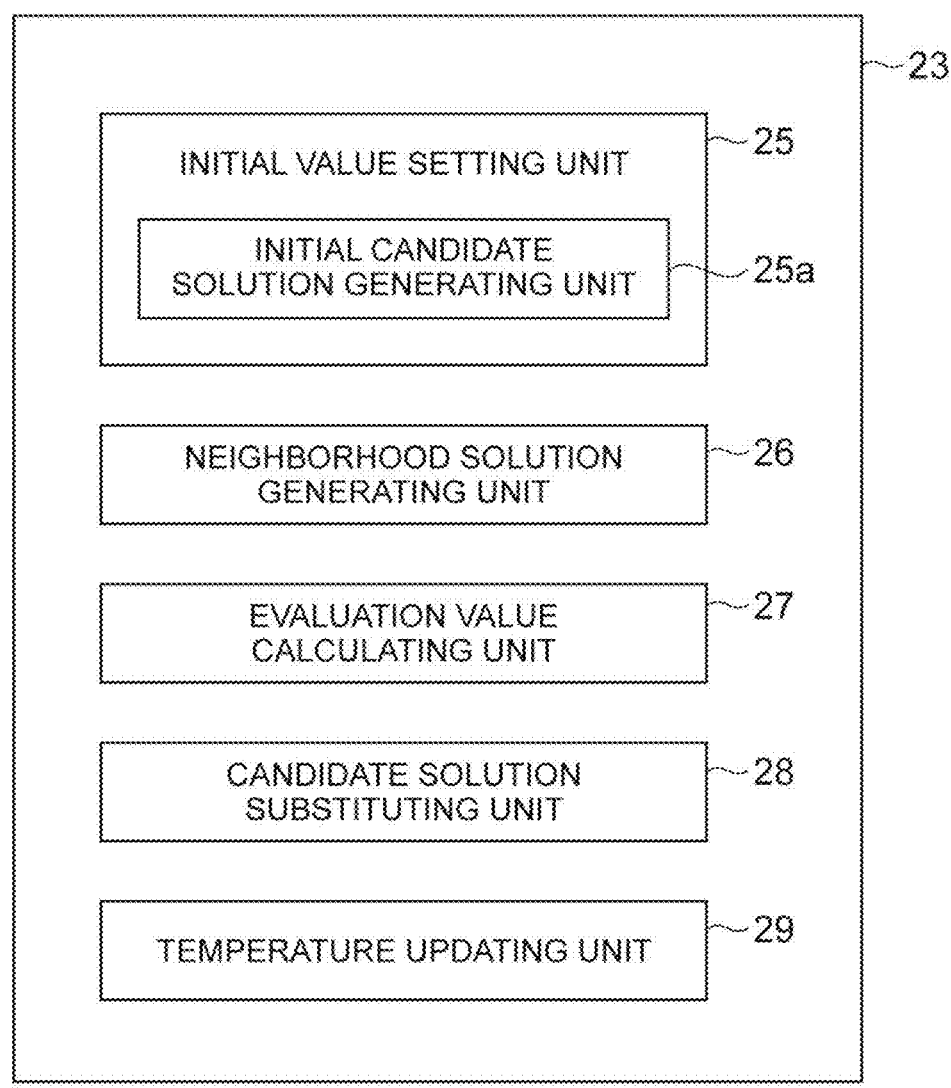
FIG. 6 is a block diagram illustrating the internal configuration of an intensity spectrum designing unit 23.
Figure 7:
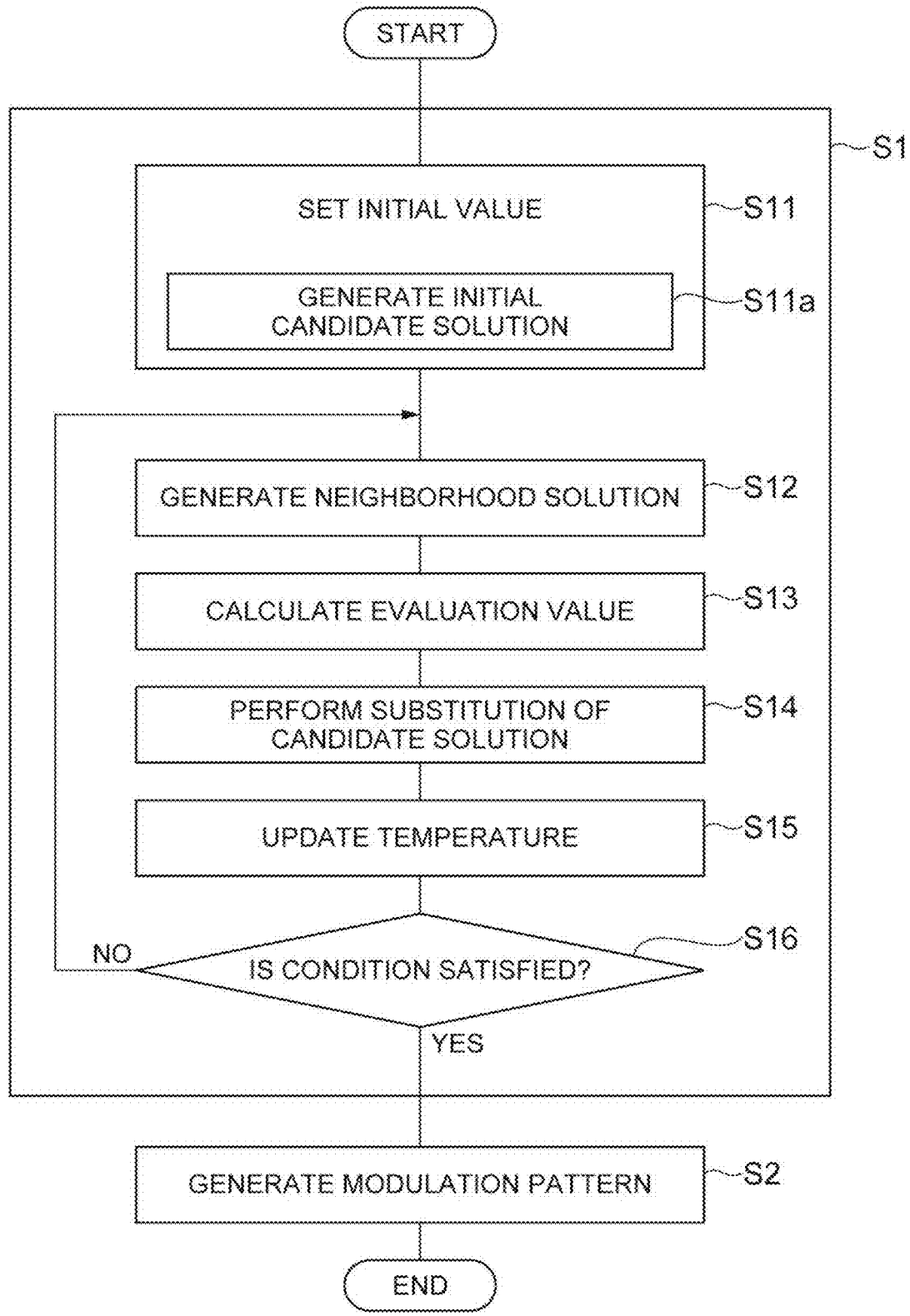
FIG. 7 is a flowchart illustrating an intensity spectrum designing method (a data generating method) using a modulation pattern calculating device 20.

FIG. 6 is a block diagram illustrating the internal configuration of the intensity spectrum designing unit 23. As illustrated in FIG. 6, the intensity spectrum designing unit 23 includes an initial value setting unit 25, a neighborhood solution generating unit 26, an evaluation value calculating unit 27, a candidate solution substituting unit 28, and a temperature updating unit 29. The initial value setting unit 25 includes an initial candidate solution generating unit 25a. FIG. 7 is a flowchart illustrating an intensity spectrum designing method (a data generating method) using the modulation pattern calculating device 20. Hereinafter, an operation of the modulation pattern calculating device 20 according to this embodiment, in other words, the intensity spectrum designing method (the data generating method), will be described with reference to FIGS. 6 and 7.

First, the intensity spectrum designing unit 23 generates an intensity spectrum function $A(\omega)$ that is appropriate for a desired time-intensity waveform input from the arbitrary waveform input unit 21 (an intensity spectrum function generating step S1). In more detail, the intensity-spectrum function generating step S1 is composed of an initial value setting step S11, a neighborhood solution generating step S12, an evaluation value calculating step S13, a candidate solution substituting step S14, and a temperature updating step S15.

In the initial value setting step S11, the initial value setting unit 25 sets an initial candidate solution $A_0(\omega)$ of an intensity spectrum function $A(\omega)$, a phase spectrum function $\Psi(\omega)$ and an initial temperature $T_0$ and a cooling rate r in a simulated annealing method. The candidate solution $A_0(\omega)$ and the phase spectrum function $\Psi(\omega)$ are functions of a frequency $\omega$. The candidate solution $A_0(\omega)$ is input by an operator. The phase spectrum function $\Psi(\omega)$ may be input by an operator or may be calculated by the phase spectrum designing unit 22. The initial temperature $T_0$ and the cooling rate r are input by the operator. In accordance with this initial value setting step S11, a waveform function (1) of the frequency domain including the initial candidate solution $A_0(\omega)$ of the intensity spectrum function $A(\omega)$ and the phase spectrum function $\Psi_0(\omega)$ are defined. This waveform function (1) is a first waveform function according to this embodiment. Here, i is an imaginary unit.

$$\sqrt{A_0(\omega)}\exp\{i\Psi_0(\omega)\} \qquad (1)$$

Figure 8:
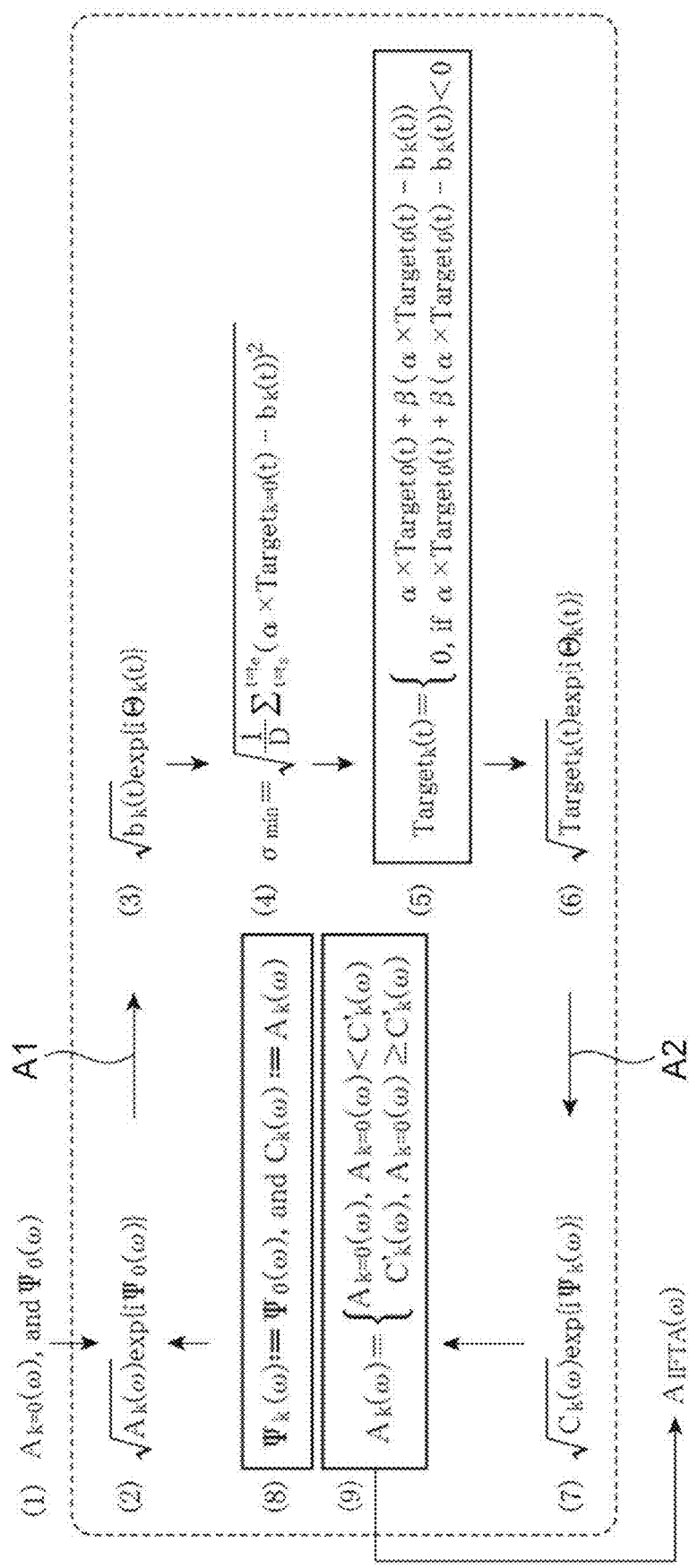

The initial value setting step S11 according to this embodiment includes an initial candidate solution generating step S11a. In the initial candidate solution generating step S11a, an initial candidate solution generating unit 25a generates an initial candidate solution $A_0(\omega)$ of the intensity spectrum function $A(\omega)$ using the iterative Fourier method. FIG. 8 is a diagram schematically illustrating a technique of calculating a candidate solution $A_0(\omega)$ using the initial candidate solution generating unit 25a. As illustrated in FIG. 8, first, the initial candidate solution generating unit 25a prepares an initial intensity spectrum function $A_{k=0}(\omega)$ and a phase spectrum function $\Psi_0(\omega)$ (a process number (1) in the drawing). In one example, the initial intensity spectrum function $A_{k=0}(\omega)$ and the phase spectrum function $\Psi_0(\omega)$ are set on the basis of a spectrum intensity and a spectrum phase of input light La. Next, the initial candidate solution generating unit 25a prepares a waveform function (2) of the frequency domain including the intensity spectrum function $A_k(\omega)$ and the phase spectrum function $\Psi_0(\omega)$ (a process number (2) in the drawing). This waveform function (2) is a third waveform function according to this embodiment.

$$\sqrt{A_k(\omega)}\exp\{i\Psi_0(\omega)\} \qquad (2)$$

Here, a subscript k represents being after the k-th Fourier transform process. Before the initial (first) Fourier transform process, the initial intensity spectrum function $A_{k=0}(\omega)$ described above is used as an intensity spectrum function $A_k(\omega)$. Here, i is an imaginary unit.

Subsequently, the initial candidate solution generating unit 25a performs a Fourier transform of the function (2) described above from the frequency domain to the time domain (an arrow A1 illustrated in the drawing). In this way, a waveform function (3) of the time domain including a time-intensity waveform function $b_k(t)$ is acquired (a process number (3) in the drawing).

$$\sqrt{b_k(t)}\exp\{i\Theta_k(t)\} \qquad (3)$$

Subsequently, the initial candidate solution generating unit 25a acquires a coefficient $\alpha$ for which a difference between the waveform function $b_k(t)$ after the Fourier transform and a function $(\alpha \times Target_0(t))$ acquired by multiplying a function $Target_0(t)$ by the coefficient $\alpha$ is smaller than a difference between the waveform function $b_k(t)$ and the function $Target_0(t)$ (a process number (4) in the drawing). In one example, as illustrated in the following Equation (4), a coefficient $\alpha$ for which a standard deviation $\sigma$ of $\alpha \times Target_0(t)$ with respect to the waveform function $b_k(t)$ after the Fourier transform is a minimum ($\sigma_{min}$) is derived through exploration. In addition, in Equation (4), D represents the number of data points, and $t_s$ and $t_e$ respectively represent a start point and an end point on a time axis.

$$\sigma_{min} = \sqrt{\frac{1}{D}\sum_{t=t_s}^{t=t_e}(\alpha \times Target_{k=0}(t) - b_k(t))^2} \qquad (4)$$

Subsequently, the initial candidate solution generating unit 25a performs a substitution based on a desired waveform (a first substitution) for the time-intensity waveform function $b_k(t)$ included in the function (3) after the Fourier transform. At this time, the initial candidate solution generating unit 25a performs the substitution using a function $(\alpha \times Target_0(t))$ acquired by multiplying the function $Target_0(t)$ representing a desired waveform by the coefficient $\alpha$. In one example, the substitution with $Target_k(t)$ calculated using Equation (5) is performed (process numbers (5) and (6) in the drawing).

$$Target_k(t) = \begin{cases} \alpha \times Target_0(t) + \beta(\alpha \times Target_0(t) - b_k(t)) & (5) \\ 0, \text{ if } \alpha \times Target_0(t) + \beta(\alpha \times Target_0(t) - b_k(t)) < 0 \end{cases}$$

$$\sqrt{Target_k(t)}\exp\{i\Theta_k(t)\} \qquad (6)$$

The subsequently, the initial candidate solution generating unit 25a performs an inverse Fourier transform of the function (6) described above from the time domain to the frequency domain (an arrow A2 in the drawing). In this way, a waveform function (7) of the frequency domain including an intensity spectrum function $C_k(\omega)$ and a phase spectrum function $\Psi_k(\omega)$ is acquired (a process number (7) in the drawing).

$$\sqrt{C_k(\omega)}\exp\{i\Psi_k(\omega)\} \qquad (7)$$

Subsequently, in order to restrict the phase spectrum function $\Psi_k(\omega)$ included in the function (7) described above, the initial candidate solution generating unit 25a performs a substitution with the initial phase spectrum function $\Psi_0(\omega)$ (a second substitution; a process number (8) in the drawing).

$$\Psi_k(\omega) = \Psi_0(\omega) \qquad (8)$$

In addition, the initial candidate solution generating unit 25a performs a filter process based on the intensity spectrum of the input light La for the intensity spectrum function $C_k(\omega)$ in the frequency domain after the inverse-Fourier transform. More specifically, portions of the intensity spectrum represented by the intensity spectrum function $C_k(\omega)$ that exceed a cutoff intensity of each wavelength set on the basis of the intensity spectrum of the input light La are filtered out. In one example, a cutoff intensity for each wavelength is set to coincide with the intensity spectrum of the input light La (in this embodiment, the initial intensity spectrum function $A_{k=0}(\omega)$). In such a case, as represented in the following Equation (9), for a frequency at which the intensity spectrum function $C_k(\omega)$ is larger than the initial intensity spectrum function $A_{k=0}(\omega)$, the value of the initial intensity spectrum function $A_k=0(\omega)$ is accepted as the value of the intensity spectrum function $A_k(\omega)$. In addition, for a frequency at which the intensity spectrum function $C_k(\omega)$ is equal to or smaller than the initial intensity spectrum function $A_{k=0}(\omega)$, the value of the intensity spectrum function $C_k(\omega)$ is accepted as the value of the intensity spectrum function $A_k(\omega)$.

$$A_k(\omega) = \begin{cases} A_{k=0}(\omega), & A_{k=0}(\omega) < C_k(\omega) \\ C_k(\omega), & A_{k=0}(\omega) \geq C_k(\omega) \end{cases} \quad (9)$$

The initial candidate solution generating unit 25a substitutes the intensity spectrum function $C_k(\omega)$ included in the function (7) described above with the intensity spectrum function $A_k(\omega)$ after a filter process according to Equation (9) described above. In addition, a method in which a cutoff intensity is relatively changed by defining a function $C'_k(\omega)$ acquired by multiplying the intensity spectrum function $C_k(\omega)$ by an arbitrary coefficient may be used (a process number (9) in the drawing).

Thereafter, the initial candidate solution generating unit 25a repeatedly performs the processes (1) to (9) described above a plurality of number of times, whereby the intensity spectrum function $A_k(\omega)$ in the waveform function can approach the intensity spectrum form corresponding to a desired time-intensity waveform. An intensity spectrum function $A_{IFTA}(\omega)$ that is finally acquired is set as the initial candidate solution $A_0(\omega)$ in the initial value setting unit 25.

FIGS. 6 and 7 will be referred to again. Next, in the neighborhood solution generating step S12, the neighborhood solution generating unit 26 generates a neighborhood solution $A_n(\omega)$ different from the (n−1)-th (here, n=1, 2, ...) candidate solution $A_{n-1}(\omega)$ of the intensity spectrum function $A(\omega)$. At that time, the neighborhood solution generating unit 26 generates the neighborhood solution $A_n(\omega)$ by changing the (n−1)-th candidate solution $A_{n-1}(\omega)$. For example, the neighborhood solution generating unit 26 generates the neighborhood solution $A_n(\omega)$ by adding an arbitrary (or random) function $U(\omega)$ to the candidate solution $A_{n-1}(\omega)$.

$$A_n(\omega) = A_{n-1}(\omega) + \Delta U_n(\omega) \quad (10)$$

FIGS. 9A and 9B are graphs illustrating examples of the function $U(\omega)$. In this example, as represented in the following Equation (11), the function $U(\omega)$ has an amount of change $k_r$ only when $\omega$ equals a certain value $\omega_r$ and has an amount of change as "0" (zero) when $\omega$ has a different value.

$$\Delta U_n(\omega) = \begin{cases} k_r, & \omega = \omega_r \\ 0, & \omega \neq \omega_r \end{cases} \quad (11)$$

In another example, the neighborhood solution generating unit 26 generates a neighborhood solution $A_n(\omega)$ by changing the (n−1)-th candidate solution $A_{n-1}(\omega)$ using a function $U(\omega)$ including a smooth convex portion. The function $U_n(\omega)$, for example, is a function including a smooth convex portion such as a Gauss type, a hyperbolic secant type, or a quadratic function type. The following Equation (12) is one example of the function $U_n(\omega)$ of the Gauss type. In addition, in Equation (12), $k_r$, $\omega_r$, $W_r$ are constants that are randomly generated for each trial. Particularly, $W_r$ is a significant constant relating to a width of the Gauss function and is a significant parameter that represents a smooth convex portion. In addition, $\omega_r$ represents the center of the function. P is a coefficient relating to a width of change and can be arbitrarily set. Here, generation of a neighborhood solution $A_n(\omega)$ is performed within the range of a spectrum intensity of the input light La.

$$\Delta U_n(\omega) = \begin{cases} k_r \exp\left\{-\dfrac{(\omega - \omega_r)^2}{2W_r^2}\right\}, & \omega_r - pW_r \leq \omega \leq \omega_r + pW_r \\ 0, & \omega_r - pW_r > \omega, \omega > \omega_r + pW_r \end{cases} \quad (12)$$

FIGS. 10A and 10B are graphs illustrating examples of the function $U(\omega)$ represented in Equation (12). It can be understood that the function $U(\omega)$ has a smooth convex portion having its center at the frequency $\omega_r$.

FIGS. 6 and 7 will be referred to again. Subsequently, in the evaluation value calculating step S13, the evaluation value calculating unit 27 transforms a first waveform function (13) of the frequency domain, which is represented in the following Equation (13), including a neighborhood solution $A_n(\omega)$ and a phase spectrum function $\Psi(\omega)$ into a waveform function (14) of the time domain, which is represented in the following Equation (14), including a time-intensity waveform function $I_n(t)$ and a time-phase waveform function $\Phi_n(t)$.

$$\sqrt{A_n(\omega)} \exp\{i\Psi(\omega)\} \quad (13)$$

$$\sqrt{I_n(t)} \exp\{i\Phi_n(t)\} \quad (14)$$

This waveform function (14) is a second waveform function according to this embodiment. Then, the evaluation value calculating unit 27 calculates an evaluation value representing a degree of a difference between the time-intensity waveform function $I_n(t)$ and a desired time-intensity waveform T(t) (=Target$_0$(t)). For example, the evaluation value calculating unit 27 calculates a standard deviation of the time-intensity waveform function $I_n(t)$ with respect to the desired time-intensity waveform T(t) as an evaluation value. At this time, when there is an energy difference between the desired time-intensity waveform T(t) and the time-intensity waveform function $I_n(t)$, an evaluation value changes due to the energy difference. In this embodiment, in order to compensate for this energy difference, an exploration-type evaluation function is introduced. More specifically, the evaluation value calculating unit 27, as represented in the following Equation (15), calculates an evaluation value representing a degree of a difference between the time-intensity waveform function In(t) and a function acquired by multiplying the function T(t) representing the desired time-phase waveform by a coefficient α.

$$\sigma_{min} = \sqrt{\dfrac{1}{D}\Sigma(\alpha T(t) - I_n(t))^2} \quad (15)$$

The coefficient α has a value of which the evaluation value is smaller than that before the multiplication using the coefficient α. As one example of the evaluation value, Equation (15) represents a standard deviation σ of the time-intensity waveform function $I_n(t)$ with respect to a function acquired by multiplying the function T(t) representing the desired time-phase waveform by the coefficient α. In this example, the coefficient α is changed such that the standard deviation σ takes a minimum value. Then, the minimum value $σ_{min}$ of the standard deviation σ is set as the evaluation value of the time-intensity waveform function $I_n(t)$.

Subsequently, in the candidate solution substituting step S14, the candidate solution substituting unit 28 sets the neighborhood solution $A_n(ω)$ as the n-th candidate solution for the probability changing for each trial being $P_n$ (here, $0<P_n≤1$) and sets the candidate solution $A_{n-1}(ω)$ as the n-th candidate solution for other cases. The probability $P_n$ is determined in accordance with evaluation values of the candidate solution $A_{n-1}(ω)$ and the neighborhood solution $A_n(ω)$ and the temperature $T_n$. In other words, when $E_{n-1}$ is the evaluation value of the candidate solution $A_{n-1}(ω)$, and $E_n$ is the evaluation value of the neighborhood solution $A_n(ω)$, the probability $P_n$ is represented as a function $P_n$ ($E_{n-1}$, $E_n$, $T_n$).

In a case in which the evaluation value $E_n$ of the neighborhood solution $A_n(ω)$ is better than the evaluation value $E_{n-1}$ of the candidate solution $A_{n-1}(ω)$, the probability $P_n$ is set as "1." In other words, in a case in which the evaluation value $E_n$ of the neighborhood solution $A_n(ω)$ is better than the evaluation value $E_{n-1}$ of the candidate solution $A_{n-1}(ω)$, the neighborhood solution $A_n(ω)$ necessarily becomes the n-th candidate solution. On the other hand, in a case in which the evaluation value $E_n$ of the neighborhood solution $A_n(ω)$ is worse than the evaluation value $E_{n-1}$ of the candidate solution $A_{n-1}(ω)$, the probability $P_n$ is set to a value less than "1" on the basis of the evaluation values $E_{n-1}$ and $E_n$ and the temperature $T_n$. At this time, a decrease in the temperature $T_n$ acts in a direction in which the probability $P_n$ decreases. The acting in the direction in which the probability $P_n$ decreases represents that, when the temperature $T_n$ decreases, the probability $P_n$ necessarily decreases in a case in which the other parameters (the evaluation values $E_{n-1}$ and $E_n$) are constant. In one example, the probability $P_n$ is represented using the following Equation (16).

$$P_n = \exp\{(E_n - E_{n-1})/T_n\} \quad (16)$$

Subsequently, in the temperature updating step S15, the temperature updating unit 29 lowers the temperature on the basis of the cooling rate r. In other words, the (n+1)-th temperature $T_{n+1}$ is represented as below using the n-th temperature $T_n$ and the cooling rate r.

$$T_{n+1} = rT_n \quad (17)$$

In the intensity spectrum function generating step S1, the neighborhood solution generating step S12, the evaluation value calculating step S13, the candidate solution substituting step S14, and the temperature updating step S15 described above are repeated with "1" added to n each time until a predetermined condition is satisfied (Step S16). In other words, the neighborhood solution generating unit 26, the evaluation value calculating unit 27, and the candidate solution substituting unit 28, and the temperature updating unit 29 repeat the processes with "1" added to n each time until a predetermined condition is satisfied. Then, the intensity spectrum designing unit 23 (in the intensity spectrum function generating step S1), sets the n-th candidate solution of a case in which the predetermined condition is satisfied as an intensity spectrum function A(ω) that is appropriate for the desired time-intensity waveform T(t). Here, the predetermined condition, for example, is a condition that the number of iteration trials that is arbitrarily set ends or a condition that an evaluation value that is arbitrarily set is satisfied.

After the processes described above, in the data generating step S2, the modulation pattern generating unit 24 generates data relating to a modulation pattern to be presented to the SLM 14 on the basis of the phase spectrum function Ψ(ω) and the intensity spectrum function A(ω) generated in the intensity spectrum function generating step S1. The modulation pattern generating unit 24 provides the generated data for the SLM 14 as a control signal SC.

Effects acquired by the light control device 1A, the modulation pattern calculating device 20, the modulation pattern calculating method, and the computer-readable recording medium according to this embodiment described above will be described. Conventionally, when light having a desired time waveform is realized using the SLM, in order to improve the accuracy of a spectrum intensity corresponding to a desired time waveform, the iterative Fourier method or a method with a modified iterative Fourier method (for example, see Patent Documents 1 and 2) is used. However, by trying generation of a multi-pulse or the like using such a method, the waveform control accuracy is improved much. However, when the shape of the waveform was analyzed in detail, it was checked that there were dispersions (deviations) in peak value or pulse widths of the pulses. This means that there is room for improving the technique for designing a waveform control pattern. Particularly, in a case in which applications of pulse light to a microscope or processing are considered, there is a possibility that a change in the pulse width and a change in the peak value has a large influence on a change in an S/N ratio of a signal and a change in the processing state. Accordingly, a technique enabling design of a waveform control pattern with a higher accuracy is preferable.

For such problems, in the modulation pattern calculating device 20, the modulation pattern calculating method, and the modulation pattern calculating program according to this embodiment, the candidate solution substituting unit 28 (or in the candidate solution substituting step S14) sets the neighborhood solution $A_n(ω)$ as the n-th candidate solution for a probability $P_n$ (here, $0<P_n≤1$) and sets the candidate solution $A_{n-1}(ω)$ as the n-th candidate solution for other cases. At that time, the probability $P_n$ is determined in accordance with the evaluation values $E_{n-1}$ and $E_n$ of the candidate solution $A_{n-1}(ω)$ and the neighborhood solution $A_n(ω)$ and the temperature $T_n$. Then, in a case in which the evaluation value $E_n$ of the neighborhood solution $A_n(ω)$ is worse than the evaluation value $E_{n-1}$ of the candidate solution $A_{n-1}$, a decrease in the temperature $T_n$ acts in a direction in which the probability $P_n$ decreases. In this case, since the temperature $T_n$ is high in the initial period of calculation (while n is small), the candidate solution actively changes also for a neighborhood solution $A_n(ω)$ of which the evaluation value $E_n$ is degraded. Then, when the temperature decreases in accordance with a gradual increase in n, the candidate solution gradually does not change for a neighborhood solution $A_n(ω)$ of which the evaluation value $E_n$ is degraded, and the candidate solution converges. According to such a system, compared to the iterative Fourier method or the method with a modified iterative Fourier method, a ratio at which the candidate solution is led to a localized solution is decreased, and an optimal solution can be searched more accurately. In other words, according to this embodiment, a spectrum intensity for causing the time waveform of the output light Ld to approach a desired waveform T(t) can be calculated at a high accuracy.

In addition, as in this embodiment, the initial value setting unit 25 (the initial value setting step S11) may include the initial candidate solution generating unit 25a (the initial candidate solution generating step S11a) that generates an initial candidate solution $A_0(\omega)$ of the intensity spectrum function $A(\omega)$. Then, the initial candidate solution generating unit 25a (the initial candidate solution generating step S11a) may generate an initial candidate solution $A0(\omega)$ through the iterative Fourier transform. According to the knowledge of the inventor of the present invention, in order to accurately search an optimal solution in the modulation pattern calculating device 20 according to this embodiment, it is extremely important to set an initial candidate solution $A_0(\omega)$. The iterative Fourier method has a characteristic of being able to calculate a solution of which the evaluation value is superior in a short time. In addition, there is a case in which a solution of which the evaluation value is further higher is presented on the neighborhood of the solution. Accordingly, by generating an initial candidate solution $A_0(\omega)$ using the iterative Fourier method and using the initial candidate solution $A_0(\omega)$, the intensity spectrum function generating step S1 can be performed efficiently and effectively. In other words, by generating the initial candidate solution $A_0(\omega)$ using the iterative Fourier method, the initial candidate solution $A_0(\omega)$ can be appropriately set.

In addition, as in this embodiment, the neighborhood solution generating unit 26 (the neighborhood solution generating step S12) may generate a neighborhood solution $A_n(\omega)$ by changing the (n−1)-th candidate solution $A_{n-1}(\omega)$ using the function $U(\omega)$ including a smooth convex portion. In this way, by controlling the degree of change from the candidate solution $A_{n-1}(\omega)$ to the neighborhood solution $A_n(\omega)$, a difference between the spectrum intensity of the input light La before modulation and the spectrum intensity of the output light Ld after the modulation (in other words, an intensity loss) can be limited within an allowed range.

In addition, as in this embodiment, the evaluation value calculating unit 27 (the evaluation value calculating step S13) may calculate an evaluation value $E_n$ representing a degree of difference between the time-intensity waveform function $I_n(t)$ and a function acquired by multiplying the function T(t) representing a desired time-phase waveform by the coefficient α and, the coefficient α may have a value for which the evaluation value $E_n$ after multiplication becomes better than that before the multiplication using the coefficient α. In this way, it can be suppressed that a difference in total energy between the desired time intensity waveform T(t) and the time-intensity waveform function $I_n(t)$ has an influence on the calculation of the evaluation value $E_n$, and the evaluation value $E_n$ can be calculated mainly on the basis of a difference in the shape between the desired time-intensity waveform T(t) and the time-intensity waveform function $I_n(t)$.

According to the light control device 1A of this embodiment, by including the modulation pattern calculating device 20, the spectrum intensity is calculated at a higher accuracy with low possibility of being led to a localized solution, the time waveform of the output light Ld can be caused to approach the desired waveform T(t).

In the description presented above, although the configuration of the intensity spectrum designing unit 23 and the method of calculating a spectrum intensity have been mainly described, as the configuration of the phase spectrum designing unit 22 and the method of calculating a spectrum phase, a conventional configuration and a conventional method (for example, the iterative Fourier method or a modified method thereof) may be used, or a configuration and a method similar to the configuration of the intensity spectrum designing unit 23 and the method of calculating a spectrum intensity according to this embodiment may be used.

EXAMPLE

Figure 11:
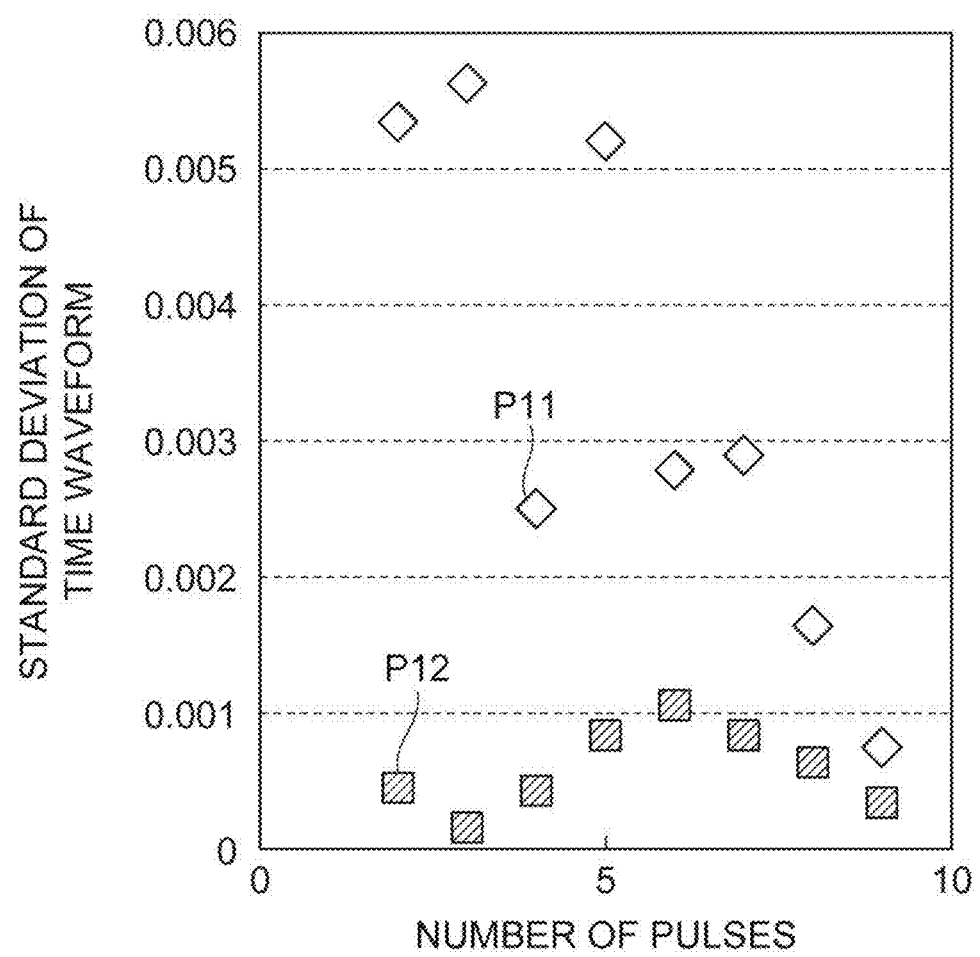
FIG. 11 is a graph in which a relation between the number of pulses and an evaluation value (a minimum value of a standard deviation represented in Equation (15)) is plotted.

In order to check the validity of the embodiment described above, a plurality of modulation patterns for generating output light Ld having a time-intensity waveform including multi-pulses were calculated with the number of pulses changed. Each pulse was a TL pulse (a single pulse having a time width of 135 fs), and a pulse interval was an equal space of 1 ps. The initial phase spectrum $\Psi_0(\omega)$ was calculated using the iterative Fourier method. FIG. 11 is a graph in which a relation between the number of pulses and an evaluation value (a minimum value of a standard deviation represented in Equation (15)) at that time is plotted. In FIG. 11, a plot P11 illustrates a case in which an intensity spectrum function $A(\omega)$ was calculated using a conventional method using only the iterative Fourier method, and a plot P12 illustrates a case in which an intensity spectrum function $A(\omega)$ was calculated using the method according to this embodiment described above. In the calculation of the intensity spectrum function $A(\omega)$ according to the method of this embodiment, Steps S12 to S15 were sufficiently repeated until the evaluation value converged. The number of times of repetition was 100,000. As illustrated in FIG. 11, for any number of pulses, according to the method of this embodiment, compared to a conventional method, the accuracy of waveform control (evaluation value) is significantly improved. Although there was a difference according to the number of pulses, it was checked that improvement of about 2 to 31 times can be expected.

Figure 12:
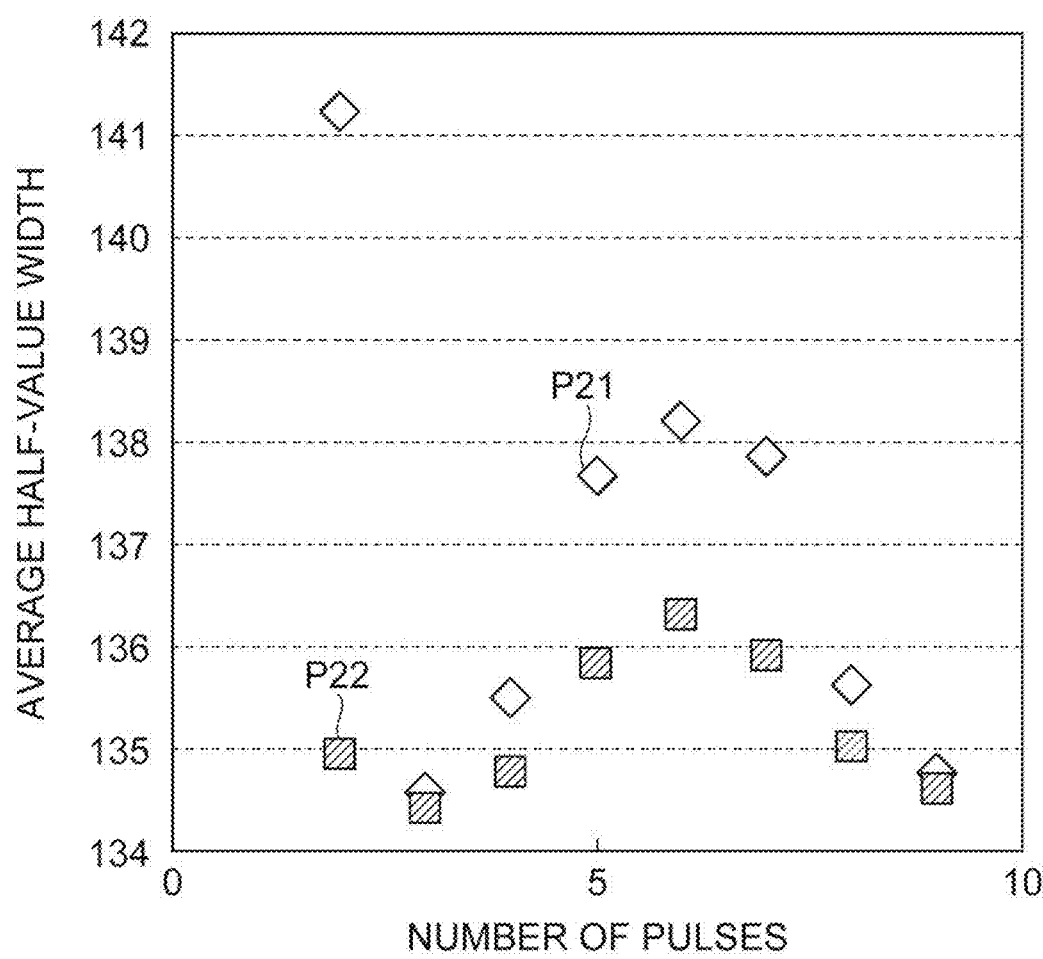
FIG. 12 is a graph in which a relation between the number of pulses according to the example described above and an average pulse width (a full-width at half maximum) is plotted.
Figure 13:
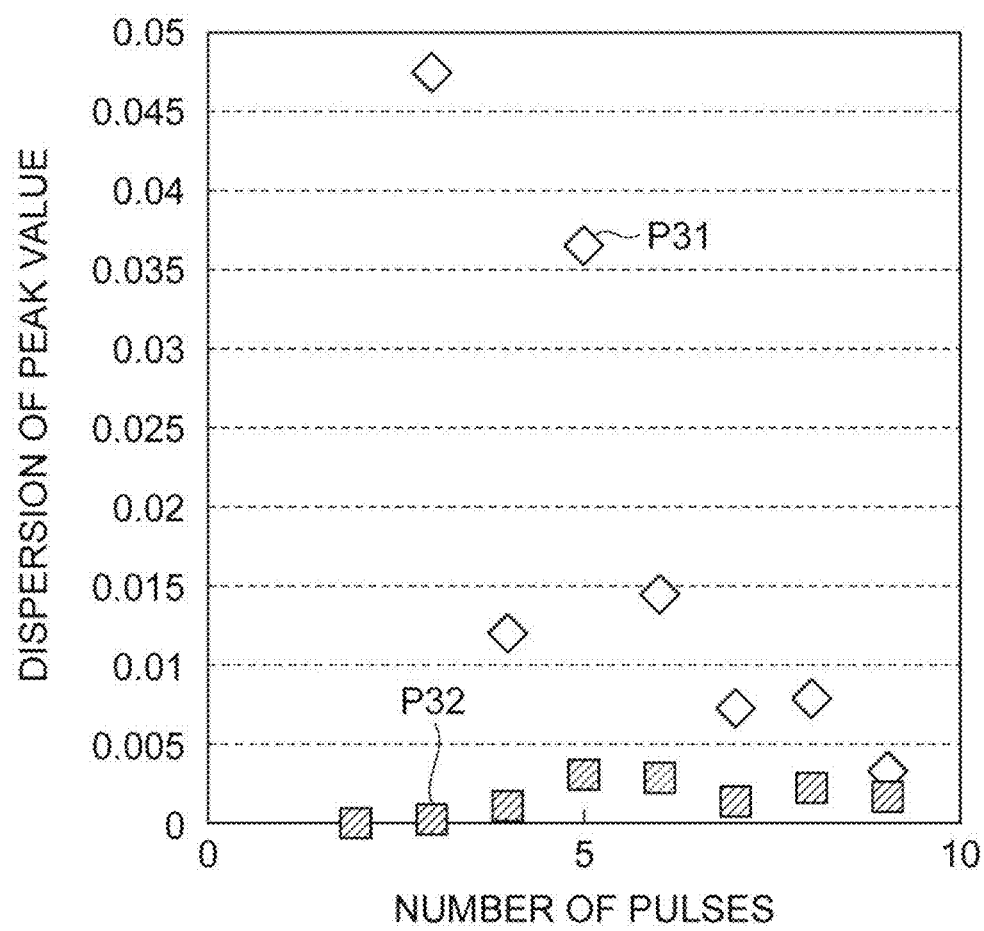
FIG. 13 is a graph in which a relation between the number of pulses and a dispersion of a peak value according to the example described above is plotted.

FIG. 12 is a graph in which a relation between the number of pulses and an average pulse width (a full-width at half maximum) according to the example described above is plotted. FIG. 13 is a graph in which a relation between the number of pulses and a dispersion of a peak value according to the example described above is plotted. In FIGS. 12 and 13, plots P21 and P31 illustrate a case in which an intensity spectrum function $A(\omega)$ was calculated using a conventional method using only the iterative Fourier method, and plots P22 and P32 illustrate a case in which an intensity spectrum function $A(\omega)$ was calculated using the method according to this embodiment described above. Based on such drawings, it is assumed that the improvement of evaluation values illustrated in FIG. 11 is due to a narrowed pulse width (near a half-value width of the IL pulse) and a decrease in the deviation of peak values.

(Second Embodiment)

The modulation pattern calculating device 20, the modulation pattern calculating method, and the modulation pattern calculating program according to the embodiment described above are not limited to be used for the design of an intensity spectrum modulation pattern (one-dimensional pattern) represented by time-pulse shaping and, for example, may be used also for designing a two-dimensional intensity modulation pattern represented by beam-intensity distribution shaping. In other words, for example, they may be used also for designing an intensity distribution of a pattern such as a hologram present in an area having a relation of an optical Fourier transform with a desired intensity pattern.

Figure 14:
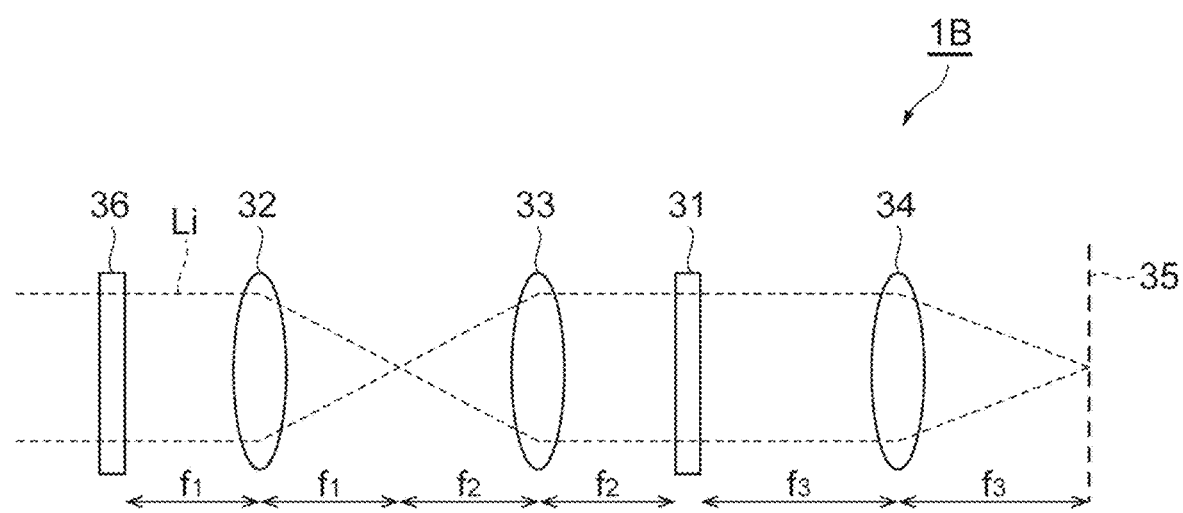
FIG. 14 is a diagram schematically illustrating the configuration of a light control device 1B according to a second embodiment.

FIG. 14 is a diagram schematically illustrating the configuration of a light control device 1B according to a second embodiment when a two-dimensional intensity modulation pattern is effectively used. In FIG. 14, a modulation pattern calculating device 20 included in the light control device 1B is not illustrated. A light source may be a pulse light source like the light source 2 according to the first embodiment or a continuous wave (CW) laser light source. As an application of the embodiment described above, the light control device 1B displays a desired light intensity distribution on a screen 35. The light control device 1B includes two SLMs 31 and 36, one pair of lenses 32 and 33, and a Fourier transform lens 34. The two SLMs 31 and 36 are optically coupled through the one pair of lenses 32 and 33. An optical distance between the SLM 36 and the lens 32 is a focal distance $f_1$ of the lens 32, and an optical distance between the SLM 31 and the lens 33 is a focal distance $f_2$ of the lens 33. In one example, the focal distance $f_1$ and the focal distance $f_2$ are the same. An optical distance between the lens 32 and the lens 33 is a sum of the focal distance $f_1$ and the focal distance $f_2$. The Fourier transform lens 34 is optically coupled with the SLM 31, and an optical distance therebetween is a focal distance $f_3$ of the Fourier transform lens 34. This light control device 1B forms an output light image on a screen 35 that is separate from the Fourier transform lens 34 by the focal distance $f_3$ to a side opposite to the SLM 31. The SLM 36 is an SLM for two-dimensional intensity modulation and presents a modulation pattern for intensity modulation provided from the modulation pattern calculating device 20. The SLM 31 is an SLM for two-dimensional phase modulation and presents a modulation pattern for phase modulation provided from the modulation pattern calculating device 20. The SLM 36 displaying a hologram pattern for intensity modulation and the SLM 31 displaying a hologram pattern for phase modulation may be interchanged.

Figure 15A:
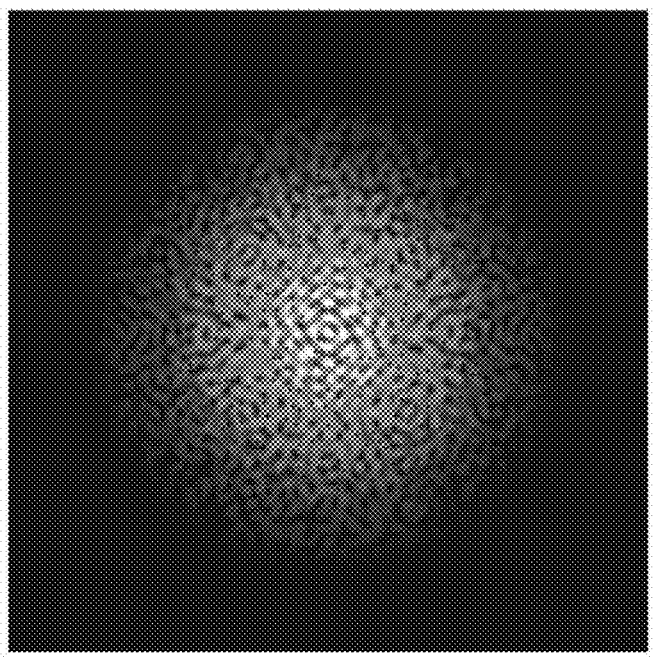
FIG. 15A is a diagram illustrating one example of an intensity distribution of output light Li seen from the direction of an optical axis of output light Li from an SLM 36.
Figure 15B:
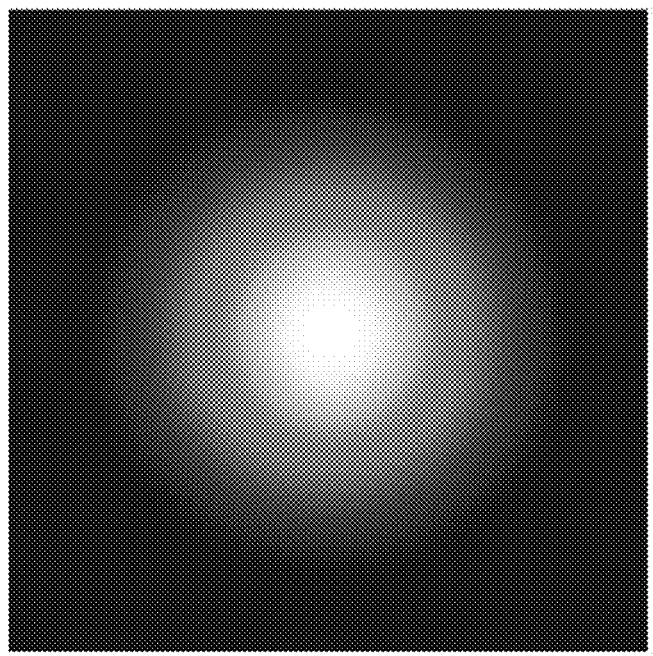
FIG. 15B is a diagram illustrating a distribution of intensity of input light input to an SLM 31 in a case in which intensity modulation using the SLM 36 is not performed as a comparative example.
Figure 16:
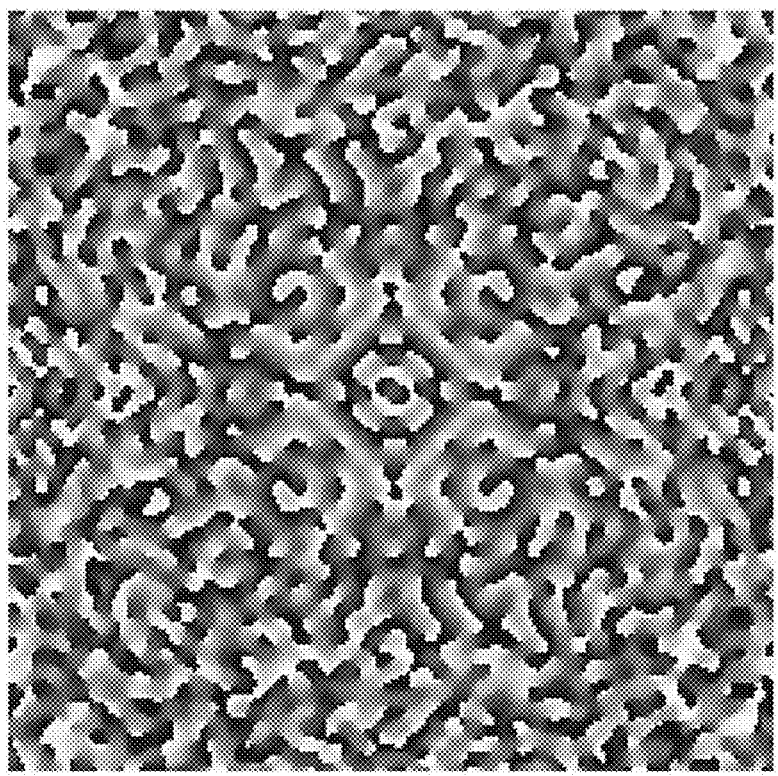
FIG. 16 is a diagram illustrating one example of a phase modulation pattern presented to the SLM 31.
Figure 17A:
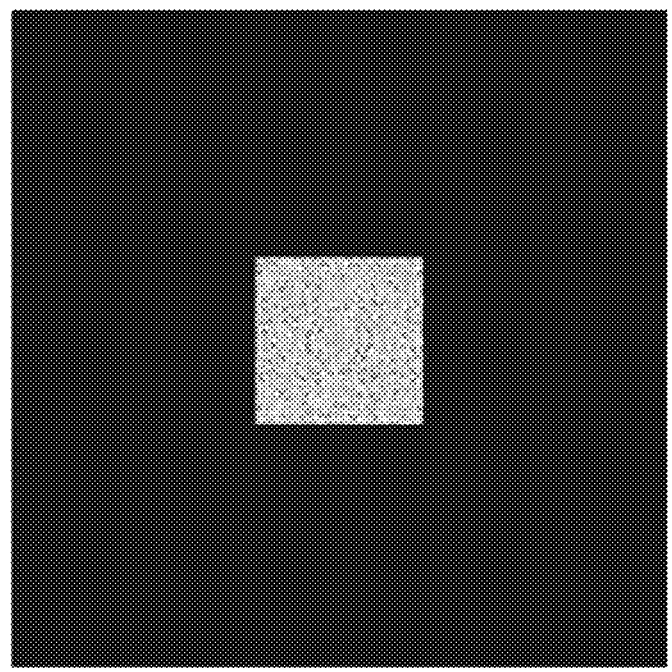
FIG. 17A is a diagram illustrating a screen projection result corresponding to the light intensity distribution illustrated in FIG. 15A.
Figure 17B:
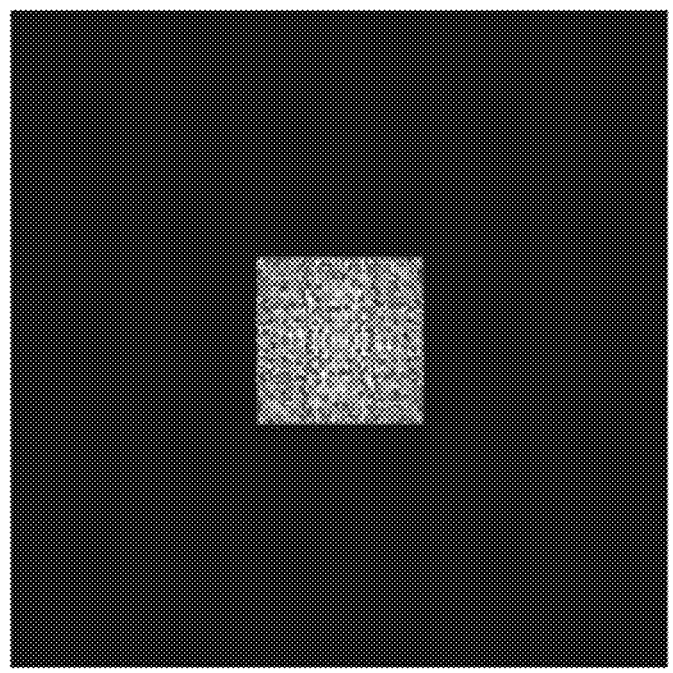
FIG. 17B is a diagram illustrating a screen projection result corresponding to the light intensity distribution illustrated in FIG. 15B.

FIG. 15A is a diagram illustrating one example of an intensity distribution of output light Li seen from the direction of an optical axis of output light Li from the SLM 36. In addition, FIG. 15B is a diagram illustrating a distribution of intensity of input light input to the SLM 31 in a case in which intensity modulation using the SLM 36 is not performed as a comparative example. In FIGS. 15A and 15B, a light intensity is represented using a shade of a color (a lighter portion has a higher light intensity). FIG. 16 is a diagram illustrating one example of a phase modulation pattern presented to the SLM 31, and a phase is represented using a shade of a color (a lighter portion has a larger phase). In such an example, an intensity distribution having a square shape in which the intensity is uniform is set as a target pattern. FIG. 17A is a diagram illustrating a screen projection result corresponding to the light intensity distribution illustrated in FIG. 15A. FIG. 17B is a diagram illustrating a screen projection result corresponding to the light intensity distribution illustrated in FIG. 15B. As illustrated in FIGS. 17A and 17B, by performing intensity modulation using the SLM 36 according to the embodiment described above, it can be understood that a result in which the intensity distribution is more uniform (in other words, closer to the desired light intensity distribution) is acquired.

The data generating device, the light control device, the data generating method, and the data generating program according to the present invention are not limited to the embodiments described above and may be variously changed. For example, in the embodiment described above, although the initial value setting unit includes the initial candidate solution generating unit, and the initial candidate solution generating unit generates an initial candidate solution $A_0(\omega)$ using the iterative Fourier method, the method of determining the initial candidate solution $A_0(\omega)$ is not limited thereto, and, for example, an arbitrary candidate solution $A_0(\omega)$ may be input. In addition, in the embodiment described above, although the neighborhood solution generating unit generates a neighborhood solution $A_n(\omega)$ by changing the (n−1)-th candidate solution $A_{n-1}(\omega)$ using a function including a smooth convex portion, the method of generating the neighborhood solution $A_n(\omega)$ is not limited thereto, and, for example, a neighborhood solution $A_n(\omega)$ may be randomly generated. Here, "randomly generated" represents that a neighborhood solution is generated completely disorderly and generated such that appearance probabilities are the same in an arbitrary range set in advance or that a neighborhood solution is generated completely disorderly and generated such that appearance probabilities are the same in an arbitrary range set in advance. In addition, in the embodiment described above, although the evaluation value calculating unit calculates an evaluation value representing a degree of difference between the time-intensity waveform function of the second waveform function and a function acquired by multiplying the function representing a desired time-phase waveform by a coefficient (Equation (15)), the method of calculating an evaluation value is not limited thereto, and an arbitrary calculation equation may be used as long as it represents a degree of difference between the time-intensity waveform function of the second waveform function and a desired time intensity waveform.

What is claimed is:

1. A method of generating data used for controlling a spatial light modulator, the method comprising:
generating an intensity spectrum function $A(\omega)$ for a target time-intensity waveform; and
generating the data on the basis of a phase spectrum function $\Psi(\omega)$ and the intensity spectrum function $A(\omega)$,
wherein generating the intensity spectrum function $A(\omega)$ includes:
setting an initial candidate solution $A_0(\omega)$ of the intensity spectrum function $A(\omega)$, the phase spectrum function $\Psi(\omega)$ and an initial temperature and a cooling rate in a simulated annealing method;
iteratively performing the following steps until a predetermined condition is satisfied, wherein n is an integer, n≥1, and n is increased to n+1 after each iteration:
generating a neighborhood solution $A_n(\omega)$ different from an (n−1)-th candidate solution $A_{n-1}(\omega)$ of the intensity spectrum function $A(\omega)$;
transforming a first waveform function of a frequency domain including the neighborhood solution $A_n(\omega)$ and the phase spectrum function $\Psi(\omega)$ into a second waveform function of a time domain including a time-intensity waveform function and a time-phase waveform function, and calculating an evaluation value of the neighborhood solution $A_n(\omega)$, the evaluation value representing a degree of difference between the time-intensity waveform function and the target time-intensity waveform;
in a case where the evaluation value of the neighborhood solution $A_n(\omega)$ is better than an evaluation value of the (n−1)-th candidate solution $A_{n-1}(\omega)$, setting the neighborhood solution $A_n(\omega)$ as an n-th candidate solution of the intensity spectrum function $A(\omega)$;

in a case where the evaluation value of the (n−1)-th candidate solution $A_n(\omega)$ is better than the evaluation value of the neighborhood solution $A_n(\omega)$, setting the (n−1)-th candidate solution $A_{n-1}(\omega)$ as the n-th candidate solution of the intensity spectrum function $A(\omega)$; and lowering the temperature on the basis of the cooling rate after setting the n-th candidate solution; and in response to the predetermined condition being satisfied, setting the n-th candidate solution as the intensity spectrum function $A(\omega)$ for the target time-intensity waveform.

2. A non-transitory computer-readable storage medium including computer-readable instructions that, when executed by a computer, cause the computer to execute the data generating method according to claim 1.

3. The method of generating data used for controlling a spatial light modulator according to claim 1, wherein the initial candidate solution $A_0(\omega)$ is set by repeatedly performing a Fourier transform of a third waveform function of the frequency domain including the intensity spectrum function $A(\omega)$ and the phase spectrum function $\Psi(\omega)$, a first substitution of the time-intensity waveform function based on the target time-intensity waveform in the time domain after the Fourier transform, an inverse Fourier transform performed after the first substitution, and a second substitution for restricting the phase spectrum function $\Psi(\omega)$ in the frequency domain after the inverse Fourier transform.

4. The method of generating data used for controlling a spatial light modulator according to claim 1, wherein the neighborhood solution $A_n(\omega)$ is generated by changing the (n−1)-th candidate solution $A_{n-1}(\omega)$ using a function including a smooth convex portion.

5. The method of generating data used for controlling a spatial light modulator according to claim 1, wherein the evaluation value is calculated representing a degree of difference between the time-intensity waveform function of the second waveform function and a function acquired by multiplying a function representing the target time-phase waveform by a coefficient, and wherein the coefficient has a value for which the evaluation value after the multiplication is better than that before the multiplication using the coefficient.

* * * * *